(12) United States Patent
Madill, Jr. et al.

(10) Patent No.: US 7,827,045 B2
(45) Date of Patent: Nov. 2, 2010

(54) SYSTEMS AND METHODS FOR ASSESSING THE POTENTIAL FOR FRAUD IN BUSINESS TRANSACTIONS

(75) Inventors: Robert P. Madill, Jr., Columbia, SC (US); Thomas Glenn Barger, Berwyn, PA (US); James Lewis Rogers, Blythewood, SC (US); Progress Qhaqhi Thabani Mtshali, Columbia, SC (US)

(73) Assignee: Computer Sciences Corporation, El Segundo, CA (US)

( * ) Notice: Subject to any disclaimer, the term of this patent is extended or adjusted under 35 U.S.C. 154(b) by 1472 days.

(21) Appl. No.: 11/068,503

(22) Filed: Feb. 28, 2005
(Under 37 CFR 1.47)

(65) Prior Publication Data

US 2005/0276401 A1    Dec. 15, 2005

Related U.S. Application Data

(63) Continuation-in-part of application No. 10/702,088, filed on Nov. 5, 2003, now abandoned.

(51) Int. Cl.
*G06Q 10/00* (2006.01)
(52) U.S. Cl. .......................................... 705/4
(58) Field of Classification Search .................. 705/4
See application file for complete search history.

(56) References Cited

U.S. PATENT DOCUMENTS

| | | | |
|---|---|---|---|
| 4,606,002 A | 8/1986 | Waisman et al. | |
| 4,638,289 A | 1/1987 | Zottnik | |
| 4,656,585 A | 4/1987 | Stephenson | |

(Continued)

FOREIGN PATENT DOCUMENTS

EP    0 280 773    9/1988

(Continued)

OTHER PUBLICATIONS

Viaene, Stijn, Derrig, Richard, Baesens, Bart, Dedene, Guido; A comparison of state of the art classification techniques for expert automobile insurance claim fraud detection; Sep. 2002; Journal of Risk and Insurance; p. 373-422.*

(Continued)

*Primary Examiner*—Charles R Kyle
*Assistant Examiner*—Seth Weis
(74) *Attorney, Agent, or Firm*—Meyertons, Hood, Kivlin, Kowert & Goetzel, P.C.; Eric B. Meyertons

(57) ABSTRACT

Methods and systems are provided for assessing the potential for fraud of an insurance claim. In some embodiments, request data may be provided to a computer system. In some embodiments, at least one fraud potential indicator may be assessed to the request data from at least one comparison of at least one request data element to at least one fraud model. In some embodiments, a fraud potential indicator may be an estimate of the potential for fraud in an insurance claim. In some embodiments, at least one fraud potential indicator for request data may be assessed based on at least one comparison of at least one request data element to additional insurance data. Some embodiments may include assessing at least one fraud potential indicator for request data based on at least one fraud potential indicator.

24 Claims, 24 Drawing Sheets

U.S. PATENT DOCUMENTS

| | | |
|---|---|---|
| 4,878,167 A | 10/1989 | Kapulka et al. |
| 4,931,793 A | 6/1990 | Fuhrmann et al. |
| 5,099,422 A | 3/1992 | Foresman et al. |
| 5,128,859 A | 7/1992 | Carbone et al. |
| 5,180,309 A | 1/1993 | Egnor |
| 5,191,522 A | 3/1993 | Bosco et al. |
| 5,201,044 A | 4/1993 | Frey, Jr. et al. |
| 5,233,513 A | 8/1993 | Doyle |
| 5,253,164 A | 10/1993 | Holloway et al. |
| 5,257,366 A | 10/1993 | Adair et al. |
| 5,317,503 A | 5/1994 | Inoue |
| 5,386,566 A | 1/1995 | Hamanaka et al. |
| 5,394,555 A | 2/1995 | Hunter et al. |
| 5,421,011 A | 5/1995 | Camillone et al. |
| 5,434,994 A | 7/1995 | Shaheen et al. |
| 5,446,659 A | 8/1995 | Yamawaki |
| 5,455,947 A | 10/1995 | Suzuki et al. |
| 5,483,442 A | 1/1996 | Black et al. |
| 5,483,632 A | 1/1996 | Kuwamoto et al. |
| 5,499,330 A | 3/1996 | Lucas et al. |
| 5,504,674 A | 4/1996 | Chen et al. |
| 5,513,348 A | 4/1996 | Ryu et al. |
| 5,523,942 A | 6/1996 | Tyler et al. |
| 5,524,205 A | 6/1996 | Lomet et al. |
| 5,524,489 A | 6/1996 | Twigg |
| 5,550,976 A | 8/1996 | Henderson et al. |
| 5,586,310 A | 12/1996 | Sharman |
| 5,615,309 A | 3/1997 | Bezek et al. |
| 5,638,508 A | 6/1997 | Kanai et al. |
| 5,689,706 A | 11/1997 | Rao et al. |
| 5,710,915 A | 1/1998 | McElhiney |
| 5,717,391 A | 2/1998 | Rodriguez |
| 5,721,915 A | 2/1998 | Sockut et al. |
| 5,732,397 A | 3/1998 | De Tore et al. |
| 5,742,820 A | 4/1998 | Perlman |
| 5,745,901 A | 4/1998 | Entner et al. |
| 5,768,505 A | 6/1998 | Gilchrist et al. |
| 5,768,506 A | 6/1998 | Randell |
| 5,794,229 A | 8/1998 | French et al. |
| 5,797,134 A | 8/1998 | McMillan et al. |
| 5,798,949 A | 8/1998 | Kaub |
| 5,815,093 A | 9/1998 | Kikinis |
| 5,832,481 A | 11/1998 | Sheffield |
| 5,862,500 A | 1/1999 | Goodwin |
| 5,864,679 A | 1/1999 | Kanai et al. |
| 5,867,494 A | 2/1999 | Krishnaswamy et al. |
| 5,870,711 A | 2/1999 | Huffman |
| 5,870,725 A | 2/1999 | Bellinger et al. |
| 5,870,746 A | 2/1999 | Knutson et al. |
| 5,873,066 A | 2/1999 | Underwood et al. |
| 5,877,707 A | 3/1999 | Kowalick |
| 5,881,379 A | 3/1999 | Beier et al. |
| 5,892,905 A | 4/1999 | Brandt et al. |
| 5,907,848 A | 5/1999 | Zaiken et al. |
| 5,909,683 A | 6/1999 | Miginiac et al. |
| 5,930,759 A | 7/1999 | Moore et al. |
| 5,933,816 A | 8/1999 | Zeanah et al. |
| 5,937,189 A | 8/1999 | Branson et al. |
| 5,940,809 A | 8/1999 | Musmanno et al. |
| 5,950,169 A | 9/1999 | Borghesi et al. |
| 5,950,192 A | 9/1999 | Moore et al. |
| 5,956,687 A | 9/1999 | Wamsley |
| 5,956,719 A | 9/1999 | Kudo et al. |
| 5,987,434 A | 11/1999 | Libman |
| 5,991,733 A | 11/1999 | Aleia et al. |
| 5,991,756 A | 11/1999 | Wu |
| 5,995,971 A | 11/1999 | Douceur et al. |
| 6,003,033 A | 12/1999 | Amano et al. |
| 6,038,393 A | 3/2000 | Iyengar et al. |
| 6,043,813 A | 3/2000 | Stickney et al. |
| 6,049,665 A | 4/2000 | Branson et al. |
| 6,064,983 A | 5/2000 | Koehler |
| 6,075,851 A | 6/2000 | Pinard et al. |
| 6,076,026 A | 6/2000 | Jambhekar et al. |
| 6,081,832 A | 6/2000 | Gilchrist et al. |
| 6,092,049 A | 7/2000 | Chislenko et al. |
| 6,105,007 A | 8/2000 | Norris |
| 6,112,209 A | 8/2000 | Gusack |
| 6,115,690 A | 9/2000 | Wong |
| 6,134,582 A | 10/2000 | Kennedy |
| 6,141,611 A | 10/2000 | Mackey et al. |
| 6,163,770 A | 12/2000 | Gamble et al. |
| 6,173,284 B1 | 1/2001 | Brown |
| 6,185,490 B1 | 2/2001 | Ferguson |
| 6,185,540 B1 | 2/2001 | Schreitmueller et al. |
| 6,202,070 B1 | 3/2001 | Nguyen et al. |
| 6,223,125 B1 | 4/2001 | Hall |
| 6,226,623 B1 | 5/2001 | Schein et al. |
| 6,236,975 B1 | 5/2001 | Boe et al. |
| 6,246,933 B1 | 6/2001 | Bague |
| 6,253,186 B1 * | 6/2001 | Pendleton, Jr. ................ 705/2 |
| 6,272,482 B1 | 8/2001 | McKee et al. |
| 6,289,339 B1 | 9/2001 | Weber |
| 6,308,187 B1 | 10/2001 | DeStefano |
| 6,330,546 B1 | 12/2001 | Gopinathan et al. |
| 6,336,096 B1 | 1/2002 | Jernberg |
| 6,341,287 B1 | 1/2002 | Sziklai et al. |
| 6,351,893 B1 | 3/2002 | St. Pierre |
| 6,363,360 B1 | 3/2002 | Madden |
| 6,381,561 B1 | 4/2002 | Bomar, Jr. et al. |
| 6,385,612 B1 | 5/2002 | Troisi |
| 6,393,386 B1 | 5/2002 | Zager et al. |
| 6,397,334 B1 | 5/2002 | Chainer et al. |
| 6,408,304 B1 | 6/2002 | Kumhyr |
| 6,438,563 B1 | 8/2002 | Kawagoe |
| 6,442,533 B1 | 8/2002 | Hinkle |
| 6,446,086 B1 | 9/2002 | Bartlett et al. |
| 6,473,740 B2 | 10/2002 | Cockrill et al. |
| 6,493,650 B1 | 12/2002 | Rodgers et al. |
| 6,532,459 B1 | 3/2003 | Berson |
| 6,557,752 B1 | 5/2003 | Yacoob |
| 6,570,609 B1 | 5/2003 | Heien |
| 6,662,164 B1 | 12/2003 | Koppelman et al. |
| 6,714,918 B2 * | 3/2004 | Deshpande et al. ........... 705/18 |
| 6,826,536 B1 * | 11/2004 | Forman ........................ 705/4 |
| 6,832,205 B1 | 12/2004 | Aragones et al. |
| 6,925,468 B1 | 8/2005 | Bobbitt et al. |
| 6,938,029 B1 | 8/2005 | Tien |
| 6,952,741 B1 | 10/2005 | Bartlett et al. |
| 6,961,708 B1 | 11/2005 | Bierenbaum |
| 6,970,844 B1 | 11/2005 | Bierenbaum |
| 7,013,284 B2 | 3/2006 | Guyan |
| 7,024,418 B1 | 4/2006 | Childress et al. |
| 7,095,426 B1 | 8/2006 | Childress |
| 7,263,492 B1 | 8/2007 | Suresh et al. |
| 7,272,259 B2 | 9/2007 | Houle et al. |
| 7,398,218 B1 | 7/2008 | Bernaski et al. |
| 2001/0027388 A1 | 10/2001 | Beverina |
| 2002/0002475 A1 | 1/2002 | Freedman |
| 2002/0035488 A1 * | 3/2002 | Aquila et al. ................. 705/4 |
| 2002/0035543 A1 | 3/2002 | Shedd et al. |
| 2002/0049619 A1 | 4/2002 | Wahlbin et al. |
| 2002/0055860 A1 | 5/2002 | Wahlbin et al. |
| 2002/0059083 A1 | 5/2002 | Wahlbin et al. |
| 2002/0059084 A1 | 5/2002 | Wahlbin et al. |
| 2002/0059085 A1 | 5/2002 | Wahlbin et al. |
| 2002/0059086 A1 | 5/2002 | Wahlbin et al. |
| 2002/0059087 A1 | 5/2002 | Wahlbin et al. |
| 2002/0059097 A1 | 5/2002 | Wahlbin et al. |
| 2002/0062232 A1 | 5/2002 | Wahlbin et al. |
| 2002/0062233 A1 | 5/2002 | Wahlbin et al. |
| 2002/0062234 A1 | 5/2002 | Wahlbin et al. |
| 2002/0062235 A1 | 5/2002 | Wahlbin et al. |
| 2002/0069091 A1 | 6/2002 | Wahlbin et al. |

| | | | |
|---|---|---|---|
| 2002/0069092 | A1 | 6/2002 | Wahlbin et al. |
| 2002/0082873 | A1 | 6/2002 | Wahlbin et al. |
| 2002/0087363 | A1 | 7/2002 | Wahlbin et al. |
| 2002/0091504 | A1 | 7/2002 | Wahlbin et al. |
| 2002/0091550 | A1 | 7/2002 | White et al. |
| 2002/0128881 | A1 | 9/2002 | Wahlbin et al. |
| 2003/0062243 | A1 | 4/2003 | Mattice |
| 2003/0069820 | A1* | 4/2003 | Hillmer et al. ............... 705/35 |
| 2003/0093672 | A1 | 5/2003 | Chicowlas |
| 2003/0097330 | A1* | 5/2003 | Hillmer et al. ............... 705/38 |
| 2003/0158759 | A1 | 8/2003 | Kannenberg |
| 2003/0158760 | A1 | 8/2003 | Kannenberg |
| 2003/0172367 | A1 | 9/2003 | Kannenberg |
| 2003/0191703 | A1 | 10/2003 | Chen et al. |
| 2004/0003347 | A1 | 1/2004 | Saidenberg et al. |
| 2004/0044895 | A1 | 3/2004 | Reasons et al. |
| 2004/0049409 | A1 | 3/2004 | Wahlbin et al. |
| 2004/0054556 | A1 | 3/2004 | Wahlbin et al. |
| 2004/0054557 | A1 | 3/2004 | Wahlbin et al. |
| 2004/0054558 | A1 | 3/2004 | Wahlbin et al. |
| 2004/0054559 | A1 | 3/2004 | Wahlbin et al. |
| 2004/0085357 | A1 | 5/2004 | Childress et al. |
| 2004/0088195 | A1 | 5/2004 | Childress et al. |
| 2004/0088196 | A1 | 5/2004 | Childress et al. |
| 2004/0088197 | A1 | 5/2004 | Childress et al. |
| 2004/0088198 | A1 | 5/2004 | Childress et al. |
| 2004/0088199 | A1 | 5/2004 | Childress et al. |
| 2004/0102984 | A1 | 5/2004 | Wahlbin et al. |
| 2004/0102985 | A1 | 5/2004 | Wahlbin et al. |
| 2004/0103004 | A1 | 5/2004 | Wahlbin et al. |
| 2004/0103005 | A1 | 5/2004 | Wahlbin et al. |
| 2004/0103006 | A1 | 5/2004 | Wahlbin et al. |
| 2004/0103007 | A1 | 5/2004 | Wahlbin et al. |
| 2004/0103008 | A1 | 5/2004 | Wahlbin et al. |
| 2004/0103009 | A1 | 5/2004 | Wahlbin et al. |
| 2004/0103010 | A1 | 5/2004 | Wahlbin et al. |
| 2004/0111301 | A1 | 6/2004 | Wahlbin et al. |
| 2004/0215494 | A1 | 10/2004 | Wahlbin et al. |
| 2004/0218801 | A1 | 11/2004 | Houle et al. |
| 2004/0223637 | A1 | 11/2004 | Houle et al. |
| 2004/0228513 | A1 | 11/2004 | Houle et al. |
| 2004/0237047 | A1 | 11/2004 | Houle et al. |
| 2005/0043961 | A1* | 2/2005 | Torres et al. ............... 705/1 |
| 2005/0060184 | A1 | 3/2005 | Wahlbin |
| 2005/0060205 | A1 | 3/2005 | Woods et al. |
| 2005/0097051 | A1 | 5/2005 | Madill et al. |
| 2005/0108063 | A1 | 5/2005 | Madill et al. |
| 2005/0192850 | A1 | 9/2005 | Lorenz |
| 2005/0276401 | A1 | 12/2005 | Madill, Jr. et al. |
| 2006/0047540 | A1 | 3/2006 | Hutton et al. |

FOREIGN PATENT DOCUMENTS

| | | |
|---|---|---|
| EP | 0 465 018 | 1/1992 |
| EP | 0 836 779 | 3/1999 |
| EP | 0 926 608 | 6/1999 |
| JP | 10197285 | 7/1998 |
| JP | 10214283 | 8/1998 |
| JP | 111611711 | 6/1999 |
| WO | 02/01460 | 1/2002 |
| WO | 2005/048045 | 5/2005 |
| WO | 2005/048046 | 5/2005 |

OTHER PUBLICATIONS

Brockett, Patrick, Derrig, Richard, Golden, Linda, Levine, Arnold, Alpert, Mark; Fraud Classification using principal component analysis of RIDITs; Sep. 2002, Journal of Risk and Insurance, p. 341-372.*

Artis, Manuel, Auyuso, Mercedes, Guillen, Montserrat; Detection of automobile fraud with discrete choice models and misclassified claims; Sep. 2002; Journal of Risk and Insurance, p. 325-341.*

Co-Pending U.S. Appl. No. 09/603,307 entitled, "System and Method for Processing Insurance Claims Using a Table of Contents" to Childress et al. filed Jun. 23, 2000.

Co-Pending U.S. Appl. No. 09/603,129 entitled, "System and Method for Identifying Critical Factors Affecting an Estimated Value Included in an Insurance Claim Consultation Report" to Jones filed Jun. 23, 2000.

Co-Pending U.S. Appl. No. 09/603,308 entitled, "System and Method for Externalization of Formulas for Assessing Damages" to Jones filed Jun. 23, 2000.

Co-Pending U.S. Appl. No. 09/603,144 entitled, "System and Method for Externalization of Rules for Assessing Damages" to Jones et al. filed Jun. 23, 2000.

Co-Pending U.S. Appl. No. 09/602,687 entitled, "Web-Enabled System and Method for Assessing Damages" to Lorenz filed Jun. 23, 2000.

Co-Pending U.S. Appl. No. 09/603,302 entitled, "Dynamic Help System for an Insurance Claims Processing System" to Childress filed Jun. 23, 2000.

Co-Pending U.S. Appl. No. 09/603,130 entitled, "Reset Button for Web-Enabled System and Method for Assessing Damages" to Lorenz filed Jun. 23, 2000.

Co-Pending U.S. Appl. No. 09/603,303 entitled, "Internet-Enabled System and Method for Assessing Damages" to Lorenz filed Jun. 23, 2000.

Co-Pending U.S. Appl. No. 09/603,304 entitled, "Pricing Models for Web-Enabled System and Method for Assessing Bodily Injury General Damages" to Lorenz filed Jun. 23, 2000.

Co-Pending U.S. Appl. No. 09/603,306 entitled, "System and Method for Displaying Messages Using a Messages Table" to Wolfe filed Jun. 23, 2000.

Co-Pending U.S. Appl. No. 10/786,572 entitled, "Systems and Methods for Printing an Insurance Document" to Osborne filed Feb. 25, 2004.

Co-Pending U.S. Appl. No. 10/838,159 entitled, "System and Method for Capturing an Image" to Van Hutten filed May 3, 2004.

Co-Pending U.S. Appl. No. 09/699,021 entitled, "Configuring Dynamic Database Packageset Switching for Use in Processing Business Transactions" to Bobbitt et al. filed Oct. 27, 2000.

Co-Pending U.S. Appl. No. 09/699,058 entitled, "Processing Business Transactions Using Dynamic Database Packageset Switching" to Doughty et al. filed Oct. 27, 2000.

Co-Pending U.S. Appl. No. 09/699,056 entitled, "Processing Business Data Using User-Configured Keys" to Doughty filed Oct. 27, 2000.

Co-Pending U.S. Appl. No. 09/699,037 entitled, "Configuring Keys for Use in Processing Business Data" to Doughty filed Oct. 27, 2000.

Co-Pending U.S. Appl. No. 09/675,380 entitled, "Business Process Framework for Reinsurance" to Weber et al. filed Sep. 29, 2000.

Co-Pending U.S. Appl. No. 09/675,379 entitled, "Multi-Dimensional Contract Framework for Reinsurance" to Sverdrup-Thygeson et al. filed Sep. 29, 2000.

Co-Pending U.S. Appl. No. 09/676,018 entitled, "Condition Component Framework for Reinsurance" to Evenshaug et al. filed Sep. 29, 2000.

Co-Pending U.S. Appl. No. 09/527,110 entitled, "User-Extensible Component Architecture for Long-Term Care Benefits" to Linan et al. filed Mar. 16, 2000.

Co-Pending U.S. Appl. No. 09/527,325 entitled, "User-Extensible Component Architecture for Defining Long-Term Care Provider Networks" to Linan et al. filed Mar. 16, 2000.

Co-Pending U.S. Appl. No. 09/527,109 entitled, "System and Method for Defining Long-Term Care Benefits" to Linan et al. filed Mar. 16, 2000.

Co-Pending U.S. Appl. No. 09/527,324 entitled, "Four-Tier Architecture for a Long Term Care Adminstration System" to Linan et al. filed Mar. 16, 2000.

Co-Pending U.S. Appl. No. 09/429,808 entitled, "Customer Claim Management System" to Marino et al. filed Oct. 29, 1999.

Co-Pending U.S. Appl. No. 09/459,260 entitled, "Business Objects Interface to Insurance Processing System" to Margoscin et al. filed Dec. 10, 1999.

Co-Pending U.S. Appl. No. 09/365,066 entitled, "Event-Triggered Transaction Processing for Electronic Data Interchange" to Frutuoso et al. filed Jul. 30, 1999.

Co-Pending U.S. Appl. No. 09/629,834 entitled, "Event-Triggered Transaction Processing for Electronic Data Interchange" to Frutuoso et al. filed Jul. 31, 2000.
Co-Pending U.S. Appl. No. 09/699,036 entitled, "Configuring Processing Releationships Among Entities of an Organization" to Bobbitt et al. filed Oct. 27, 2000.
Co-Pending U.S. Appl. No. 09/699,015 entitled, "Business Transaction Processing Systems and Method" to Bobbitt et al. filed Oct. 27, 2000.
Co-Pending U.S. Appl. No. 09/699,038 entitled, "Smart Trigger for Use in Processing Business Transactions" to Shaw filed Oct. 27, 2000.
Co-Pending U.S. Appl. No. 09/386,862 entitled, "Session User Interface for Capturing Information During Customer Interview" to Baker et al. filed Aug. 31, 1999.
Co-Pending U.S. Appl. No. 09/386,858 entitled, "Product Recommendation Tool for Evaluating Responses to Customer Questions" to Baker et al. filed Aug. 31, 1999.
Co-Pending U.S. Appl. No. 09/386,860 entitled, "Specialized System Parameter Services for Controlling and Defining a Line of Business" to Baker et al. filed Aug. 31, 1999.
Co-Pending U.S. Appl. No. 09/648,929 entitled, "Production Builder for Compiling Objects Generated by a Business Modeler" to Bierenbaum filed Aug. 25, 2000.
Co-Pending U.S. Appl. No. 09/648,912 entitled, "Business Modeler for Defining and Organizing Financial Service Process Flow" to Bierenbaum filed Aug. 25, 2000.
Co-Pending U.S. Appl. No. 09/648,246 entitled, "System and Method for Directing and Managing Financial Service Organization Transactions" to Bierenbaum filed Aug. 25, 2000.
"@ Fault a Commitment to Consistency," Computer Sciences Corporation, Copyright 2000, pp. 1-2.
Merlin, Jr., William F., "Colossus: What We Know Today," The Merlin Law Group, Aug. 2000, Tampa, FL, pp. 1-8.
Merlin, Jr., William F., "Collision Course With the Colossus Program: How to Deal With It," The Merlin Law Group, May 2000, Tampa, FL, pp. 1-17.
Merlin, Jr., William F., "Overcoming Allstate's Trade Secrets and Work-Product Objections," The Merlin Law Group, Mar. 2000, Tampa, FL, pp. 1-31.
Mead, Jay, Technical Communication, Aug. 1998, V. 45, N.3, p. 353-380.
Scopus Introduces World's Most Complete Call Center Solution for Financial Services; PR Newswire dated Nov. 5, 1997.
Borland, Russel; "Running Microsoft Outlook 97", Microsoft Press, 1997.
Juhl, Randy P., "The OTC Revolution"; Drugtopics.com; Mar. 3, 1997, pp. 1-9.
Written Opinion, PCT/US00/18020, mailed Jul. 16, 2001.
International Preliminary Examination Report, PCT/US00/29978.
Written Opinion, PCT/US00/29978 mailed Mar. 25, 2002.
International search report application No. PCT/ US 00/18016, mailed Nov. 10, 2000.
International search report application No. PCT/US 00/18020 mailed Nov. 10, 2000.
Written Opinion application No. PCT/ US 00/18016, mailed Jul.19, 2001.
U.S. Patent and Trademark Office, "Communication" for U.S. Appl. No. 10/702,094 mailed Sep. 3, 2008.
U.S. Patent and Trademark Office, "Communication" for U.S. Appl. No. 10/702,094 mailed Apr. 2, 2009.
U.S. Patent and Trademark Office, "Communication" for U.S. Appl. No. 10/702,088 mailed Feb. 6, 2008.
U.S. Patent and Trademark Office, "Communication" for U.S. Appl. No. 10/702,088 mailed Sep. 2, 2008.
U.S. Patent and Trademark Office, "Communication" for U.S. Appl. No. 10/702,088 mailed Jan. 26, 2009.
U.S. Patent and Trademark Office, "Communication" for U.S. Appl. No. 10/702,094 mailed Feb. 9, 2007.
U.S. Patent and Trademark Office, "Communication" for U.S. Appl. No. 10/702,094 mailed Aug. 23, 2007.
U.S. Patent and Trademark Office, "Communication" for U.S. Appl. No. 10/702,094 mailed Jan. 25, 2008.
U.S. Patent and Trademark Office, "Communication" for U.S. Appl. No. 10/702,094 mailed Mar. 30, 2005.
U.S. Patent and Trademark Office, "Communication" for U.S. Appl. No. 10/702,094 mailed Oct. 13, 2005.
U.S. Patent and Trademark Office, "Communication" for U.S. Appl. No. 10/702,094 mailed Feb. 16, 2006.
U.S. Patent and Trademark Office, "Communication" for U.S. Appl. No. 10/702,094 mailed Aug. 16, 2006.
International Preliminary Examination Report, Appl. No. PCT/US04/36794 mailed Nov. 3, 2005.
Written Opinion, Appl. No. PCT/US04/36794 mailed Nov. 3, 2005.
International Preliminary Examination Report, Appl. No. PCT/US04/36792 mailed Jul. 27, 2005.
Written Opinion, Appl. No. PCT/US04/36792 mailed Jul. 27, 2005.
Madill, Robert and Tom Barger, "Detecting Fraud at the First Notice of Loss" CSUGA International Conference, Oct. 21, 2001 (17 pages).
"CSC Fraud Solutions Overview", Presentation 1, Nov. 9, 2001 (20 pages).
"CSC Fraud Solutions Overview", Presentation 2, Nov. 9, 2001 (9 pages).
"Fraud Solutions for Claims", Presentation, Oct. 2002 (30 pages).
Barger, Tom, "@First Overview", Presentation, Oct. 11, 2002 (6 pages).
@First Process Flow, Presentation, Oct. 11, 2002 (2 pages).
@First Proposed Product Description, Apr. 19, 2001 (4 pages).
CSC and Magnify Form Strategic Alliance; Magnify Press Release, Mar. 14, 2002 (2 pages).
Metlife Auto and Home Chooses CSC Software to Identify Fraudulent Claims; Press Release Apr. 23, 2002 (3 pages).
U.S. Patent and Trademark Office, "Communication" for U.S. Appl. No. 09/969,024 mailed Jan. 31, 2006.
U.S. Patent and Trademark Office, "Communication" for U.S. Appl. No. 09/969,024 mailed Jun. 1, 2006.
U.S. Patent and Trademark Office, "Communication" for U.S. Appl. No. 09/969,022 mailed Apr. 6, 2006.
U.S. Patent and Trademark Office, "Communication" for U.S. Appl. No. 09/969,015 mailed Jun. 1, 2006.
U.S. Patent and Trademark Office, "Communication" for U.S. Appl. No. 09/969,019 mailed Jun. 1, 2006.
U.S. Patent and Trademark Office, "Communication" for U.S. Appl. No. 09/969,018 mailed Jan. 26, 2006.
U.S. Patent and Trademark Office, "Communication" for U.S. Appl. No. 09/969,018 mailed Jun. 2, 2006.
U.S. Patent and Trademark Office, "Communication" for U.S. Appl. No. 09/969,027 mailed Mar. 3, 2006.
U.S. Patent and Trademark Office, "Communication" for U.S. Appl. No. 09/969,020 mailed Jan. 26, 2006.
U.S. Patent and Trademark Office, "Communication" for U.S. Appl. No. 09/969,020 mailed Jul. 5, 2006.
U.S. Patent and Trademark Office, "Communication" for U.S. Appl. No. 09/969,545 mailed Mar. 23, 2006.
U.S. Patent and Trademark Office, "Communication" for U.S. Appl. No. 09/969,536 mailed Mar. 24, 2006.
U.S. Patent and Trademark Office, "Communication" for U.S. Appl. No. 09/969,534 mailed Feb. 17, 2006.
U.S. Patent and Trademark Office, "Communication" for U.S. Appl. No. 09/970,161 mailed Mar. 23, 2006.
U.S. Patent and Trademark Office, "Communication" for U.S. Appl. No. 09/969,016 mailed Mar. 3, 2007.
U.S. Patent and Trademark Office, "Communication" for U.S. Appl. No. 09/969,017 mailed Mar. 1, 2006.
U.S. Patent and Trademark Office, "Communication" for U.S. Appl. No. 09/969,516 mailed Aug. 10, 2006.
U.S. Patent and Trademark Office, "Communication" for U.S. Appl. No. 09/969,020 mailed Dec. 21, 2006.
U.S. Patent and Trademark Office, "Communication" for U.S. Appl. No. 09/969,018 mailed Dec. 4, 2006.
U.S. Patent and Trademark Office, "Communication" for U.S. Appl. No. 09/969,017 mailed Oct. 11, 2006.
U.S. Patent and Trademark Office, "Communication" for U.S. Appl. No. 09/969,017 mailed May 9, 2007.

U.S. Patent and Trademark Office, "Communication" for U.S. Appl. No. 09/969,534 mailed May 30, 2007.
U.S. Patent and Trademark Office, "Communication" for U.S. Appl. No. 09/969,018 mailed Jun. 21, 2007.
U.S. Patent and Trademark Office, "Communication" for U.S. Appl. No. 09/969,027 mailed Jun. 20, 2007.
U.S. Patent and Trademark Office, "Communication" for U.S. Appl. No. 09/969,024 mailed May 23, 2007.
U.S. Patent and Trademark Office, "Communication" for U.S. Appl. No. 10/306,623 mailed Mar. 7, 2007.
U.S. Patent and Trademark Office, "Communication" for U.S. Appl. No. 10/306,866 mailed Jun. 21, 2007.
U.S. Patent and Trademark Office, "Communication" for U.S. Appl. No. 10/306,858 mailed Jun. 29, 2007.
U.S. Patent and Trademark Office, "Communication" for U.S. Appl. No. 09/969,146 mailed Feb. 28, 2006.
U.S. Patent and Trademark Office, "Communication" for U.S. Appl. No. 09/969,546 mailed Mar. 21, 2006.
U.S. Patent and Trademark Office, "Communication" for U.S. Appl. No. 09/969,016 mailed Mar. 3, 2007.
U.S. Patent and Trademark Office, "Communication" for U.S. Appl. No. 09/969,021 mailed Mar. 8, 2007.
U.S. Patent and Trademark Office, "Communication" for U.S. Appl. No. 09/969,021 mailed Feb. 27, 2006.
U.S. Patent and Trademark Office, "Communication" for U.S. Appl. No. 09/969,020 mailed Jul. 5, 2007.
U.S. Patent and Trademark Office, "Communication" for U.S. Appl. No. 10/306,873 mailed Sep. 20, 2007.
U.S. Patent and Trademark Office, "Communication" for U.S. Appl. No. 10/306,804 mailed Oct. 3, 2007.
U.S. Patent and Trademark Office, "Communication" for U.S. Appl. No. 10/306,909 mailed Oct. 5, 2007.
U.S. Patent and Trademark Office, "Communication" for U.S. Appl. No. 10/306,803 mailed Oct. 5, 2007.
U.S. Patent and Trademark Office, "Communication" for U.S. Appl. No. 10/306,908 mailed Oct. 5, 2007.
U.S. Patent and Trademark Office, "Communication" for U.S. Appl. No. 10/306,864 mailed Oct. 4, 2007.
U.S. Patent and Trademark Office, "Communication" for U.S. Appl. No. 09/969,545 mailed Oct. 18, 2007.
U.S. Patent and Trademark Office, "Communication" for U.S. Appl. No. 10/306,628 mailed Oct. 10, 2007.
U.S. Patent and Trademark Office, "Communication" for U.S. Appl. No. 10/239,029 mailed Jun. 29, 2007.
U.S. Patent and Trademark Office, "Communication" for U.S. Appl. No. 09/696,516 mailed Nov. 14, 2007.

* cited by examiner

Claim Summary

Claim Number: 1215498   DOL: 12/02/2002   DOR: 12/04/2002   Loss Location: Intersection at Oak & 3rd Streets Accident Description: Insd made left turn in front of Claimant   Policy Number: 51994885221-1

— Involved Vehicle: 1992 Volvo Stationwagon

Object ID: 236   Vin Number: W2E12SEWS81GE3S8E   Registration: LKE1589

— Involved Party

+ John Smith   Address: 123 Main Street, Gopher, LA 55896   Injury Description: Minor Injury + John Smith Jr   Address: 123 Main Street, Gopher, LA 55896   Injury Description: Minor Injury — Involved Vehicle: 2000 Honda Accord Object ID: 236   Vin Number: TE48SWST6TE86845   Registration: US1-ER85

— Involved Party

Henry Higgins   Address: 1505 S. Cockney Lane, LA 55896   Injury Description: Minor Injury — Related Party                                                                 Role Smith & Smith   315 Main Street, Gopher, LA 55896   Attorney Western Auto Repair   7461 W. 5th Street, Gopher, LA 55896   Repair Shop Return to Prior Screen — 1113

Manager Notebook

| Referred | Assigned | Rejected |

Regional Manager: Randy Davis

Total Claims Assigned: 26

| SEL | Last Name | First Name | FCO | Claim Number | Loss Date | Score Date | PME Score | ISE Score | BRE Score | Days Assigned | Inv Status | Clan Status |
|---|---|---|---|---|---|---|---|---|---|---|---|---|
| ☐ | Burgess | Robert | Albany Field Claim Office | AL4128883 | 11/04/1999 | 01/29/2003 | 100 | 0 | 97.15 | 0 | New | Activ |
| ☐ | Burgess | Robert | Albany Field Claim Office | AL2957127 | 06/09/1996 | 01/28/2003 | 100 | 0 | 97.475 | 0 | New | Activ |
| ☐ | Burgess | Robert | Naperville Field Claim Office | ALA204610 | 04/14/2000 | 01/28/2002 | 100 | 0 | 92.6 | 0 | New | Activ |
| ☐ | Burgess | Robert | Naperville Field Claim Office | ALA267500 | 08/19/2000 | 01/28/2003 | 100 | 0 | 67.8 | 0 | New | Resp |
| ☐ | Burgess | Robert | Albany Field Claim Office | ALA372230 | 10/23/2000 | 01/28/2003 | 100 | 0 | 90.175 | 0 | New | Activ |
| ☐ | Mendez | Pam | Albany Field Claim Office | ALA281575 | 12/19/2001 | 01/28/2003 | 100 | 0 | 58.4 | 0 | New | Activ |
| ☐ | Burgess | Robert | Albany Field Claim Office | ALA405630 | 12/12/2000 | 01/28/2003 | 100 | 0 | 27.2 | 0 | New | Subra |
| ☐ | Mendez | Pam | Albany Field Claim Office | ALA411730 | 11/14/2000 | 01/28/2000 | 100 | 0 | 68.5 | 0 | New | Activ |
| ☐ | Mendez | Pam | Naperville Field Claim Office | ALA450330 | 01/04/2001 | 01/28/2003 | 100 | 0 | 74.4 | 0 | New | Resp |
| ☐ | Mendez | Pam | Naperville Field Claim Office | MDA015720 | 11/10/2001 | 01/28/2003 | 100 | 0 | 72 | 0 | New | Activ |

To re-assign a claim use the mouse to click the column under the heading "Sel" and press the ReAssign button. To narrow the displayed list press the "Filter" button.

[Show All] [Filter...] [Assign]

Navigation
- Home
- Manager Notebook
- Investigator
- Notebook
- Watch List
- Links
- References

FIG. 16

Manager Notebook

| Referred | Assigned | Rejected |

Regional Manager: Randy Davis

Total Claims Rejected: 59

| SEL | Last Name | First Name | FCO | Claim Number | Loss Date | Score Date | PME Score | ISE Score | BRE Score | Reason Rejected | Rejected Date | Claim Status |
|---|---|---|---|---|---|---|---|---|---|---|---|---|
| ☐ | Davis | Randy | Seattle Field Claim Office | SEA221410 | 09/02/2001 | 09/10/2003 | 100 | 450 | 38 | Valid Score-Satisfactory Review | 09/04/2003 | Close |
| ☐ | Davis | Randy | Seattle Field Claim Office | SEA446650 | 01/16/2003 | 01/30/2003 | 100 | 0 | 50 | Faulty PME Score | 02/04/2003 | Activ |
| ☐ | Davis | Randy | Dallas Field Claim Office | DAA691970 | 01/02/2003 | 02/19/2003 | 22 | 0 | 104 | Faulty PME Score | 02/04/2003 | Close |
| ☐ | Davis | Randy | Seattle Field Claim Office | SEA169480 | 09/30/2001 | 01/20/2003 | 28 | 0 | 23.6 | Valid Score-Satisfactory Review | 02/04/2003 | Subr |
| ☐ | Davis | Randy | St. Louis Field Claim Office | SLA066760 | 04/04/2000 | 02/13/2003 | 96 | 0 | 20 | Faulty PME Score | 02/04/2003 | Resp |
| ☐ | Davis | Randy | St. Louis Field Claim Office | SLA249750 | 08/05/2001 | 02/16/2003 | 98 | 0 | 56 | Valid Score-Satisfactory Review | 02/04/2003 | Activ |
| ☐ | Davis | Randy | Dallas Field Claim Office | 4W0016909 | 01/07/1999 | 02/10/2003 | 98 | 0 | 59.375 | Valid Score-Satisfactory Review | 02/04/2003 | Close |
| ☐ | Davis | Randy | Seattle Field Claim | SEA434870 | 12/14/2002 | 01/30/2003 | 98 | 0 | 70.6 | Faulty PME Score | 02/04/2003 | Subr |

To assign a claim use the mouse to click the column under the heading. Set and press the 'Assign' button Assign

Navigation
- Home
- Manager Notebook
- Investigator
- Notebook
- Watch List
- Links
- References

Identity Search Engine Results

Claim Number [ 154985 ]

S-1  Met Historical Database ─ 1815

Source Name [ Shelia Thompson ]   Points [ 52 ] ─ 1817   Address [ 5815 N. Treeline Dr., Gopher, LA 55895 ]

Matches

| Claims | Match Name | Match Address |
|---|---|---|
| 151984 | Shelia Thompson | 5815 N. Treeline Dr., Gopher, LA 55895 |
| 545233 | Shelly Thompson | 5815 N. Treeline Dr., Gopher, LA 55895 |
| 125984 | Shawn Thompson | 5815 N. Treeline Dr., Gopher, LA 55895 |

1809

S-2  NICB Database ─ 1811

Source Name [ Shelia Thompson ]   Points [ 65 ] ─ 1813   Address [ 5815 N. Treeline Dr., Gopher, LA 55895 ]

Matches

| Record # | Match Name | Match Address |
|---|---|---|
| 15941518 | Shelly Thompson | 5815 N. Treeline Dr., Gopher, LA 55895 |
| 55984898 | Shawn Thompson | 5815 N. Treeline Dr., Gopher, LA 55895 |

1807

[ Accident Description ]

Investigator Notebook  Business Rules Summary

Claim Number: ALAB879960

SIU Business Rules Summary
2009

| Points | | Reason for score |
|---|---|---|
| 22 | B-1 Injury Type | |
| 28 | B-2 Loss type is left turn | |
| 0 | B-3 Diff Between Date of Loss Vs Date of Report is | |
| 0 | B-4 is not scored as Nbr of Renewals is 24 | |
| 0 | B-5 Diff Between Date of report vs policy Exp Date is | |
| 0 | B-6 Police Report Filed: Y | |
| 0 | B-7 Reported By Insured | |
| 0 | B-8 Number of Vehicles is 2 | |
| 50 | Total Score | |

To view additional information about Injury Type use the mouse to click on "Injury Type" in the table above.

Accident Description clmt made a left hand turn at an intersection cutting off insd

[Previous]

Navigation
- Home
- Manager Notebook
- Investigator
- Notebook
- Watch List
- Administration
- Support Data
- User Setup
- Company Setup
- Links
- References

Investigator Notebook > Business Rules Summary > Business Rules Detail

SIU Business Rules Detail                    Claim Number: ALAB878960

| Points | Name | Injury Description |
|---|---|---|
| 2 | RATCLIFF, JENNIFER | minor injury (superficial/ abrasion) |
| 2 | DEPAUL, RYAN | minor injury (superficial/ abrasion) contusion |
| 2 | RATCLIFF, TIMOTHY A | Unknown |
| 22 | Total Score | |

Accident Description clmt made a left hand turn at an intersection cutting off insd Previous Navigation
- Home
- Manager Notebook
- Investigator
- Notebook
- Watch List
- Administration
  - Support Data
  - User Setup
  - Company Setup
- Links
- References

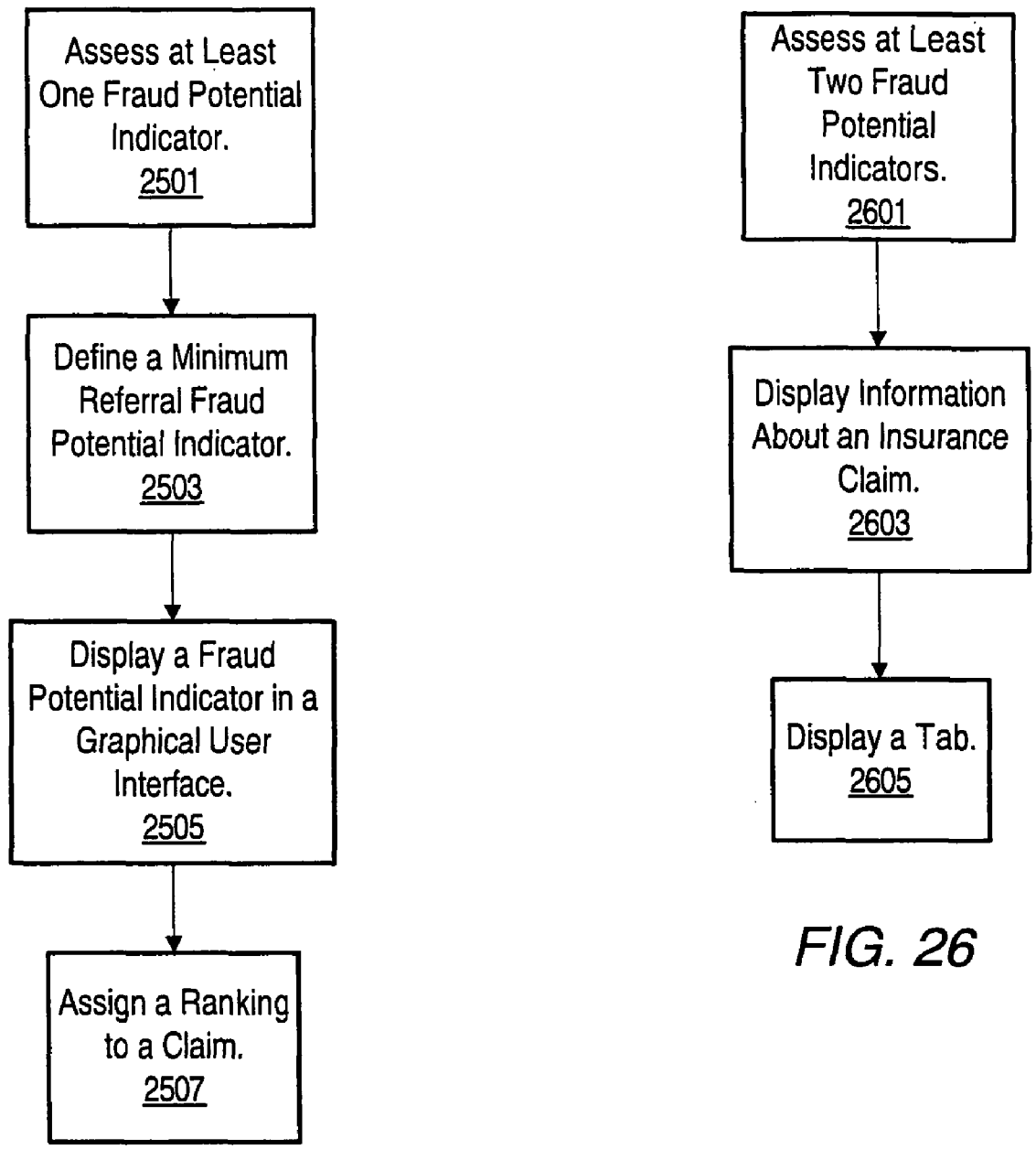

SYSTEMS AND METHODS FOR ASSESSING THE POTENTIAL FOR FRAUD IN BUSINESS TRANSACTIONS

PRIORITY CLAIM

This application is a continuation in part of U.S. patent application Ser. No. 10/702,088 entitled "SYSTEMS AND METHODS FOR ASSESSING THE POTENTIAL FOR FRAUD IN BUSINESS TRANSACTIONS," filed Nov. 5, 2003 now abandoned.

BACKGROUND OF THE INVENTION

1. Field of the Invention

The present invention generally relates to detecting the potential for fraud. In particular, embodiments relate to systems and methods of assessing fraud potential in multiple industries.

2. Description of the Related Art

While fraud affects many companies, it may be difficult to detect. For example, insurance fraud may be difficult to detect because insurance criminals may not be easily identifiable. Insurance criminals may range from organized fraud rings to dishonest individuals. Other types of fraud may include mortgage loan fraud, banking fraud, and health care fraud.

Furthermore, property and casualty insurers typically rely on adjustors and special investigation units (SIUs) within their companies to investigate potentially fraudulent requests (e.g., insurance claims, bank checks, loan applications, and health care billing—i.e., "requests" for financial transactions from customers of a financial institution). Insurance companies, banks, and mortgage lenders, however, may have a limited number of adjusters and investigators. Therefore, it may not be feasible to manually investigate every request filed for fraudulent activity.

Some methods for detecting the potential for fraud have focused on identifying a subset of requests for investigation that have a high potential for fraud. Such methods may make use of insurance industry databases that have been developed to assist in detecting the potential for fraud. For example, the National Insurance Crime Bureau (NICB) of Palos Hills, Ill. compiles a database of insurance claim data from member property and casualty insurance companies that insurance companies can access to determine if one of their current claims is potentially fraudulent. The NICB database includes suspicious requests that have been submitted to all participating insurance companies. In addition, ISO of Jersey City, N.J. provides a product, ISO requestSearch™, that includes databases for insurance claim data. There is generally incentive to identify only requests with the greatest potential of fraud to reduce the "false-positive" rate. Such a system may reduce time spent on human analysis while also reducing the costs to the company of fraudulent requests.

SUMMARY OF THE INVENTION

In various embodiments, a potential for fraud may be assessed (e.g., in insurance claims, mortgage loans, banking transactions, and health care billing) using a computer system to which data is provided. While the embodiments described below describe assessing a probability for fraud in insurance claims, it is to be understood that these embodiments may also be adjusted to detect the potential of fraud in requests in other industries such as, but not limited to, banking, mortgage loans, and health care. In some embodiments, the potential for fraud may be assessed using multiple fraud potential detection techniques including, but not limited to, identity searches, identity validation, model comparisons, and business rule evaluations.

In some embodiments, a relative probability of potential for fraud in a claim may be determined and a respective fraud potential indicator assigned, using a fraud potential detection technique. For example, at least one fraud potential indicator may be assessed based on at least one comparison of at least one request data element (e.g., a data element in a request to the company) to data in a database or watch list for matches and near matches. In some embodiments, at least one first fraud potential indicator may be assessed from at least one comparison of at least one request data element to at least one fraud model. In some embodiments, various request data elements may be verified to confirm the probable existence of the data (e.g., confirming that a person listed on a claim exists and actually lives at a listed address). In various embodiments, a fraud model may be created using historical fraud patterns in claims that have been proven fraudulent. Other fraud models are also contemplated. In some embodiments, at least one fraud potential indicator may be assessed using business rules designed to detect potentially fraudulent requests.

In various embodiments, two or more fraud potential detection techniques may be used together (e.g., using a combined or averaged score from each technique) to give an indication of the potential for fraud in a request. In some embodiments, if the score is greater than a predetermined threshold, action may be taken on the request to further investigate the potential for fraud. Some embodiments may include modifying the threshold to obtain a desired quantity of request referrals for further review.

In some embodiments, a method of assessing the potential for fraud in a request may include assessing at least one first fraud potential indicator for request data from at least one comparison of at least one request data element to other data. For example, a database of suspicious names, places, cars, etc. may be maintained and compared against data from current requests. In some embodiments, a "watch-list" of data elements to look for may also be maintained (e.g., by an adjustor) and compared to current request data. In some embodiments, matches and near matches may be used to assign a "score" or fraud potential indicator for a request. In some embodiments, types of matches, frequency of matches, and frequency of near-matches may indicate a higher or lower potential of fraud. In some embodiments, the types and frequency of matches may be weighted to assign a score relative to the potential for fraud in the request.

In various embodiments, the potential for fraud in a request may be assessed using an identity verification engine to verify the identification of various individuals and businesses involved in the request. For example, the insured, the claimant, doctors, lawyers, and/or other individuals may be verified by using sources such as, but not limited to, public records and bills (e.g., phone bills) to verify that the information provided for each of these individuals and businesses in the request is consistent with an actual individual or business.

In various embodiments, request data may be compared to models created based on past historical fraud patterns. In some embodiments, predictive modeling, analytical modeling, and data mining techniques may be used to determine potential for fraud in a request based on how closely the request resembles the model.

In various embodiments, business rules may be used to detect issues related to the potential for fraud in a claim such as, but not limited to, injury types, date of loss compared to date of report, policy expiration compared to the date of the report, existence of a police report, and the number of vehicles involved. In some embodiments, the business rules may be modified to accommodate for regional differences and changing trends in fraud.

In various embodiments, other components may be added. For example, an administrative component may be added to allow a user to load information, values, thresholds, and/or other data for using the system. In some embodiments, the system may include links to relevant websites (e.g., with investigative tools). In some embodiments, references may be included for use by people such as, but not limited to, adjustors and investigators. For example, a link to the state of New York Insurance Manual may be included. Other components are also contemplated.

BRIEF DESCRIPTION OF THE DRAWINGS

A better understanding of the present invention may be obtained when the following detailed description of preferred embodiments is considered in conjunction with the following drawings, in which:

FIG. 11 illustrates a screenshot of an insurance claim summary, according to an embodiment.

FIG. 13 illustrates a screenshot of a watch list update, according to an embodiment.

FIG. 15 illustrates a screenshot of a manager notebook with the assigned tab selected, according to an embodiment.

FIG. 16 illustrates a screenshot of a manager notebook with the rejected tab selected, according to an embodiment.

FIG. 18 illustrates a screenshot of identity search engine results, according to an embodiment.

FIG. 20 illustrates a screenshot of a business rules summary, according to an embodiment.

FIG. 21 illustrates a screenshot of business rules details, according to an embodiment.

FIG. 25 illustrates a flowchart of a method for displaying assessment results, according to an embodiment.

FIG. 26 illustrates a flowchart of a method for displaying information about requests using tabs, according to an embodiment.

Figure 1:
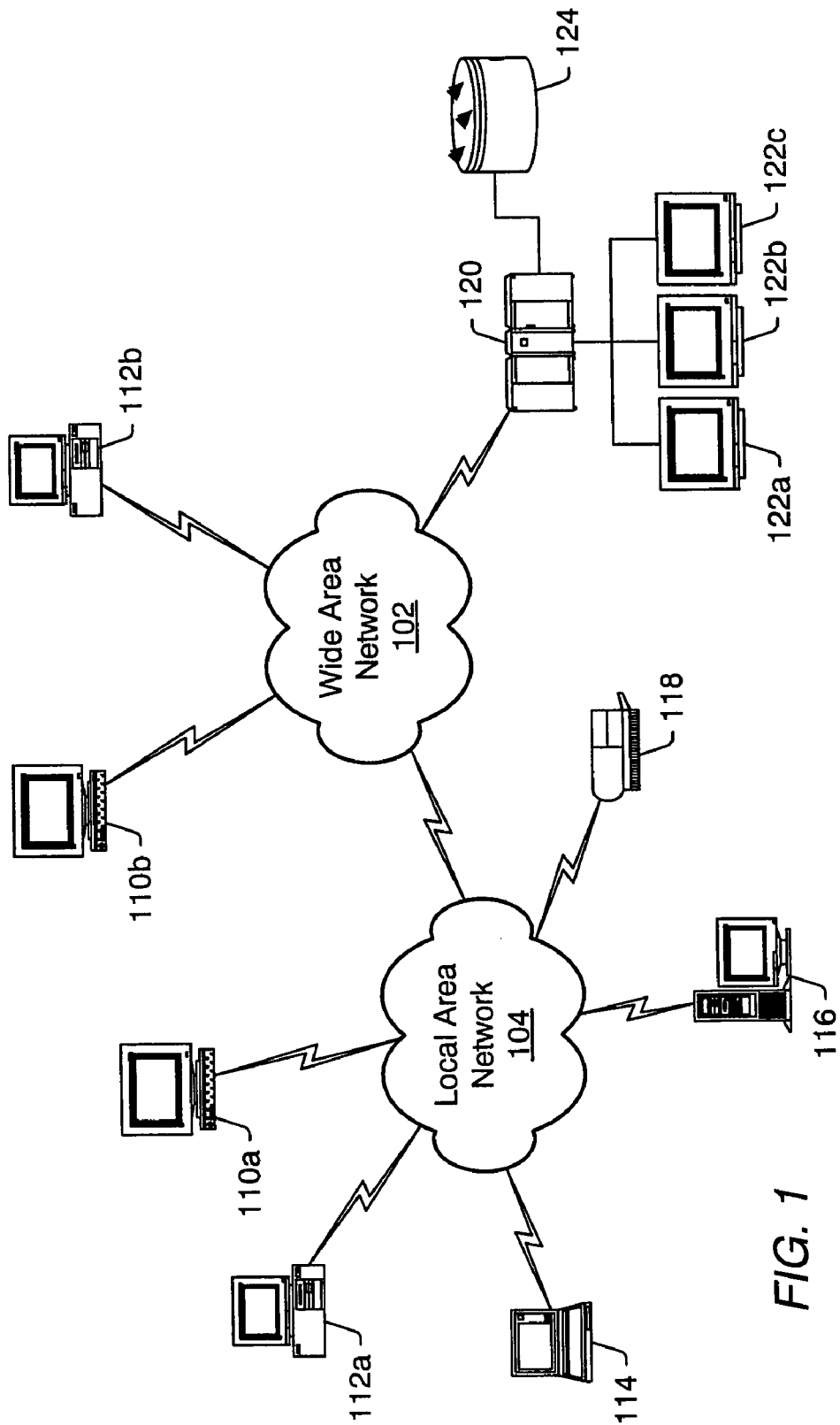
FIG. 1 illustrates a network diagram of a wide area network suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended requests.

DETAILED DESCRIPTION OF SEVERAL EMBODIMENTS

FIG. 1 illustrates an embodiment of a wide area network ("WAN"). WAN 102 may be a network that spans a relatively large geographical area. The Internet is an example of WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more local area networks ("LANs") 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs, and each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices such as one or more workstations 10a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104 for purposes of example, workstation 110b and personal computer 112b. For example, WAN 102 may include computer systems that may be geographically remote and connected to each other through the Internet.

Figure 2:
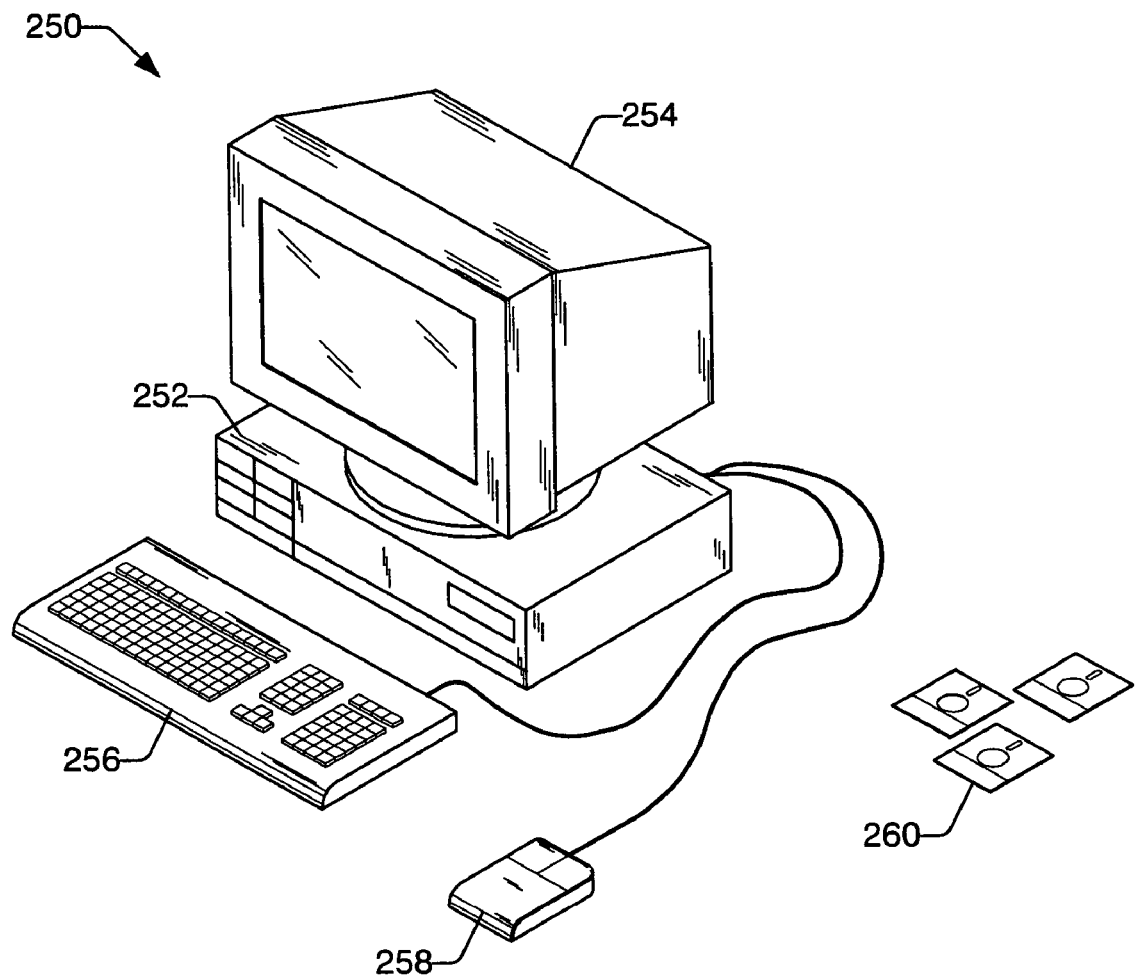
FIG. 2 illustrates a computer system suitable for implementing various embodiments.

FIG. 2 illustrates an embodiment of computer system 250 that may be suitable for implementing various embodiments of a system and method for assessing the potential for fraud in requests (e.g., insurance claims, bank checks, loan requests, and health care bills). Each computer system 250 typically includes components such as CPU 252 with an associated memory medium such as floppy disks 260. The memory medium may store program instructions for computer programs. The program instructions may be executable by CPU 252. Computer system 250 may further include a display device such as monitor 254, an alphanumeric input device such as keyboard 256, and a directional input device such as mouse 258. Computer system 250 may be operable to execute the computer programs to implement computer-implemented systems and methods for assessing the potential for fraud in insurance claims.

Computer system 250 may include a memory medium on which computer programs according to various embodiments may be stored. The term "memory medium" is intended to include an installation medium, e.g., a CD-ROM or floppy disks 260, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. Computer system 250 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for assessing the potential for fraud in insurance claims. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 252 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Various embodiments include assessing the potential for fraud in requests. While various embodiments for assessing the potential for fraud are discussed below with respect to insurance claims, it is to be understood that these embodiments may also be applied to detecting other kinds of fraud including, but not limited to, check fraud, mortgage or other loan application fraud, and health billing fraud. As used herein a "claim" may refer to a demand for compensation for a loss, such as, but not limited to, medical treatment due to bodily injury, death of an insured, property damage, etc. In addition, the systems and methods disclosed herein may be used to detect the potential for various kinds of fraud in insurance claims such as, but not limited to, health, property and casualty, and/or life.

In various embodiments, request data may include information related to any parties related to the request. For example, parties related to the request may include, but are not limited to, claimants, witnesses, insured parties, medical providers, and/or individuals and/or businesses providing repair services. The term "request data" is used in the following descriptions to refer to data related to requests (e.g., checks, insurance claims, mortgage or other loan applications, and health care billing). In some embodiments, request data related to an insurance claim may include, but is not limited to, date of the claim and/or date of loss, inception date of a policy, expiration date of a policy, addresses of parties related to the claim, and details of the loss or the accident leading to the loss. Details of an accident may include, but are not limited to, the type of accident (e.g., a rear-end collision), the number of parties involved, type and degree of property damage, type and degree of injuries, trajectory of vehicles in a vehicle accident, and/or location of the accident. In some embodiments, a characteristic of an accident may also include a set of two or more individual characteristics. For example, a set of characteristics may describe a type of accident that is commonly staged to perpetrate insurance fraud.

In some embodiments, request data may include check data. For example, check data may include information on a drawer (person who writes the check), a payee (the person to whom the check is payable to), a date, an account number, a routing number, and information on involved banks including, but not limited to, a drawee bank and a depository bank. In some embodiments, request data may include loan application data. For example, loan application data may include, but is not limited to, information about the loan applicant, loan applicant's credit history, other debts of the loan applicant, income level of the loan applicant, criminal history of the loan applicant, social security number, address, other obligations (e.g., child support), information on the item to be purchased with the loan money (e.g., title search), and information about other parties involved in the loan. In some embodiments, request data may include health care billing data (e.g., name of person receiving care, name of the doctor, type of treatment, and extent of stay in a hospital). Other types of data may also be analyzed as request data.

In various embodiments, the potential for fraud may be detected using multiple fraud potential detection techniques including, but not limited to, identity searches, identity verifications, model comparisons, and business rule evaluations. In some embodiments, an overall relative level of potential for fraud (i.e., overall fraud potential indicator) may be assigned using multiple fraud potential indicators from one or more fraud potential detection techniques. For example, in some embodiments, at least one fraud potential indicator may be assessed based on at least one comparison of at least one request data element to data in a database or watch list for matches and near matches. In some embodiments, a fraud potential indicator may be assessed from at least one comparison of at least one request data element to at least one fraud model. In some embodiments, a fraud potential indicator may be assessed from attempting to verify a request data element. In various embodiments, a fraud potential indicator may be assessed by comparing request data elements to a fraud model created using historical fraud patterns in past requests proven fraudulent. Other fraud models are also contemplated. In some embodiments, at least one fraud potential indicator may be assessed using business rules designed to detect the potential for fraud in a request.

In various embodiments, two or more fraud potential detection techniques may be used together (e.g., using a combined or averaged score from each technique) to give an indication of whether fraud may exist in a request. In some embodiments, if the score is greater than a predetermined threshold, action may be taken on the request to further investigate the potential of fraud. Some embodiments may include modifying the threshold to obtain a desired quantity of request referrals for further review. For example, if the threshold is set too low, a large number of requests may be referred for review including requests with a low potential for fraud.

Figure 3:
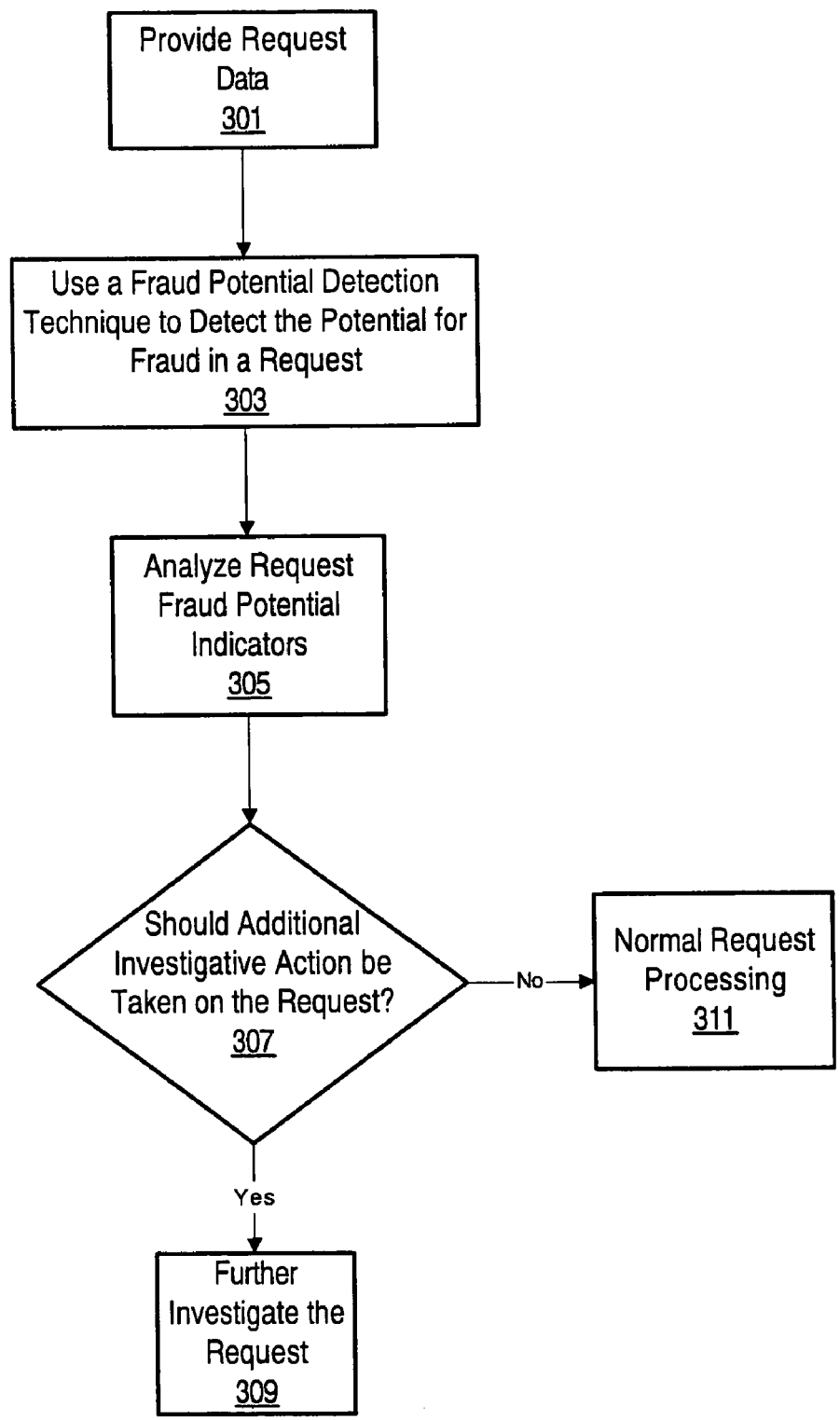
FIG. 3 illustrates a flowchart of a method for assessing the potential for fraud in a request, according to an embodiment.

FIG. 3 illustrates a flowchart of an embodiment of a process for assessing the potential for fraud in requests. At 301, request data for a request may be provided (e.g., imported from an insurance claims processing system of an insurance carrier) to a computer system for assessing the potential for fraud in the request. In some embodiments, the request data may include first notice of loss (FNOL) data taken at the time of loss from the claimant and other policy data, information on a check to be cashed, or information about a requested loan. Other request data is also contemplated. Request data may be extensive and may include, but is not limited to, information about an insured, a claimant, and other involved parties. Information about other involved parties may include information about involved businesses, doctors, and lawyers. Other request data may include the date of the request, the type of loss, how many people were involved, and information about vehicles or property involved. Other types of request data are also contemplated.

In certain embodiments, request data (e.g., claim data, check data, and loan data) on a processing system (e.g., insurance claim processing system, check processing system, and loan processing system) may be updated as new information is obtained. In some embodiments, the request data may be transmitted on a periodic basis (e.g., every 24 hours) to the computer system for assessing fraud potential. In some embodiments, a computer system may both collect and process data without having to transmit the data to another computer system. In some embodiments, the data may be analyzed in real-time (e.g., as the data is being entered or processed, for example, by an adjuster).

In various embodiments, a relevant profile (e.g., claim data profile, check data profile, and loan data profile) may be created. For example, a request data profile may be created by extracting information relevant to assessing the potential for fraud in a request to form a condensed version of the request data. In some embodiments, the request data may not be extracted (i.e., a request data profile may not be created), but, instead, the request data may be used as needed by the computer system.

At 303, a fraud potential detection technique may be used to detect the potential for fraud in a request (e.g., an insurance claim). For example, search engines, model comparisons, and business rules may be used to detect the potential for fraud in a request. In some embodiments, an assessment of fraud potential (i.e., a fraud potential indicator) in a request may be represented by a numerical indicator (e.g., a "score"), a ranking (e.g., using letters), or a pass/fail indicator. Other assessment representations are also contemplated. The fraud potential indicator may indicate a relative potential for fraud. For example, a fraud potential indicator may be on a scale of one to ten with one indicating a very low potential for fraud and ten indicating a very high potential for fraud.

In various embodiments, fraud potential detection techniques may include identity searches, identity verifications, predictive modeling, and business rules. Other techniques are also contemplated. In some embodiments, the identity searches may compare request data to internal and external databases (e.g., an internal "watch list" or a National Insurance Crime Bureau (NICB) database) to find matches between the databases and the request data. In certain embodiments, request data may be verified. In some embodiments, predictive modeling may compare request data to historical fraudulent patterns (e.g., request data from past proven fraudulent requests). In some embodiments, the identity searches may compare check data and loan data to internal and external databases to find matches that may indicate a potential for fraud. In various embodiments, business rules may be used to find issues in the request data that may indicate the potential for fraud. In some embodiments, identity searches, identity verification, predictive modeling, and business rules may be used to detect an absence of potential for fraud (e.g., request data that indicates the request probably is not fraudulent). Various embodiments may include one or more of the fraud potential detection techniques to assign one or more fraud potential indicators. In embodiments with multiple fraud potential indicators, the fraud potential indicators may be combined (e.g., by adding and/or weighting) to provide a single fraud potential indicator for a request. In some embodiments, the fraud potential indicators may be used separately.

At 305, a request's fraud potential indicators may be analyzed. In some embodiments, the fraud potential indicators may be manually analyzed (e.g., by an adjuster) to determine if further investigation is needed. In some embodiments, the fraud potential indicators may be compared to a threshold. In various embodiments, if there are multiple fraud potential indicators for a request, the fraud potential indicators may be combined and the combined fraud potential indicator may be compared to a threshold to determine if further action is needed. In some embodiments, multiple requests may be ranked in order, according to their fraud potential indicators (e.g., highest probable fraudulent request may be listed first). In certain embodiments, only requests with fraud potential indicators above a threshold may be ranked.

At 307, a determination may be made whether to take additional investigative action on a request. At 309, if a determination is made to take further investigative action on the request, the request may be further investigated. In some embodiments, the requests may be assigned to an adjuster, investigator, and/or Special Investigative Unit (SIU) based on the level of potential for fraud in the request (e.g., based on the request's fraud potential indicators). For example, a request with relatively low fraud potential indicators may be assigned to an adjuster, while a request with fraud potential indicators above a certain threshold may be assigned to investigators. In some embodiments, if the fraud potential indicators are above a certain threshold, the request may be referred to an SIU.

At 311, if a determination is made not to take further investigative action on the request, the request may be processed normally. In some embodiments, if fraud potential indicators are low enough (e.g., negative), payment of the request may be expedited. In some embodiments, as additional request data becomes available, the request may be reassessed. In addition, requests may be reassessed for other reasons (e.g., if new predictive models are developed).

Figure 4A:
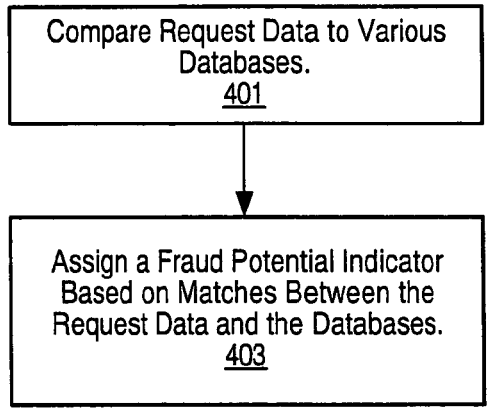
FIG. 4a illustrates a flowchart of a method for detecting a potential for fraud in a request using an identity search, according to an embodiment.

FIG. 4a illustrates a flowchart of an embodiment of a method for assessing potential for fraud in a request using an identity engine. At 401, the request data may be compared to various databases. In various embodiments, request data may be searched for people, addresses, vehicles, businesses, and other data elements that may indicate a potential for fraud in the request. In some embodiments, people, vehicles, and businesses involved in the request may be compared to people, vehicles, and businesses listed in databases, such as, but not limited to, the National Insurance Crime Bureau (NICB) database, an insurance companies historical claims database, a commercial mailbox database, a "watch list" database, and an SIU database for a match. For example, people involved in the request (e.g., claimant, insured, drawer, payee, and loan applicant) may be searched by their first name, last name, social security number, address, city, home phone, and work phone. In some embodiments, vehicles may be searched by vehicle type, VIN number, and license tag number. For example, if a vehicle involved in the current request was also involved in a past claim that was proven fraudulent and therefore the vehicle was listed in the NICB database, the current request may be assigned a high fraud potential indicator. Other external databases may also be searched. In some embodiments, a high frequency of previous requests (e.g., insurance claims), involving the same person or vehicle may indicate a higher potential for fraud. In some embodiments, businesses that may not be suspicious even though they appear in multiple claims (e.g., a rental car company) may not be searched. A commercial mailbox database may have addresses that belong to commercial mail receiving agencies (CMRAs) (organizations that rent out commercial mailboxes). The use of a commercial mailbox may be indicate that a person is trying to disguise themselves for fraud purposes. Various levels of fraud potential indicators may be assigned depending on whether the commercial mailbox is used by a person or a business involved in the request.

In some embodiments, a "watch list" database (i.e., a custom database) may be established to find requests with certain people, vehicles, businesses, and other data elements that indicate the possibility of fraud. In some embodiments, an organization may be added to the watch list. Information about the organization on the watch list may include, but is not limited to, the business name, the DBA name, the address, the phone numbers, the role of the organization respective to the claim, and the tax identification number of the organization. Other information that may be included on the watch list may include the source of the information for an entry on the watch list, the author of the entry on the watch list, the author's region, and other comments.

In various embodiments, the watch list may be set up by an adjustor or SIU. Other entities may also create a watch list. If a match is detected, the author of the particular watch list involved may be notified and a corresponding fraud potential indicator may be assigned.

In various embodiments, other types of databases may also be searched. For example, a sanctioned medical providers database may be searched for businesses that have been disciplined for questionable business practices. Other databases maintained by industry groups and commercial entities may also be searched. In some embodiments, industry databases may be searched. For example, an "industry database" may refer to a centralized database that includes request data contributed by more than one insurance company to assist other insurance companies in detecting fraud.

In some embodiments, databases may be searched that do not indicate a possibility of fraud but instead are searched for other reasons such as, but not limited to, compliance with state and federal laws. For example, the Office of Foreign Assets Control (OFAC) database may be searched for request data elements to indicate the involvement of possible terrorists (in compliance with the requirements set forth in the Patriot Act).

At 403, a fraud potential indicator may be assigned to the request based on matches between the request data and entries in at least one of the databases. In some embodiments, the identity fraud potential indicator may be weighted based on the frequency of matches, frequency of near matches, type of match (e.g., type of database matched), number of databases matched, and other factors. For example, a higher fraud potential indicator may be assigned to a request in which the name of the claimant matches a listed name in the NICB's database and the insurance company's internal database than if a claimant had only matched an entry on the insurance company's internal database. In some embodiments, the request may be given a higher fraud potential indicator if multiple request data elements match entries in one or more searched databases. For example, a request may be given a higher fraud potential indicator if the name of the claimant and the claimant's listed physician match names on the NICB's database than if only the claimant's name was found in the NICB's database. In some embodiments, a request may receive a higher fraud potential indicator if a request element matches a data element in a database than if the request element was a near-match to a data element in the database. In addition, near matches may be weighted differently depending on the degree of match (e.g., the number of letters that match compared to the number of letters that do not match). In some embodiments, the fraud potential indicator may be based on other expert knowledge of insurance claims and/or fraud assessment. In some embodiments, a fraud potential indicator may be assigned to each request data element that matches and a total identity fraud potential indicator may be assigned based on the fraud potential indicators for the various request data elements (e.g., by adding or averaging the fraud potential indicators for multiple request data elements).

In various embodiments, if a person appears in another claim in the insurance company's historical claims database, multiple elements of the claims may logically match and therefore be weighted as only one match for assigning an identity fraud potential indicator. For example, if the same person appears in two claims, the person's name, address, and phone number may all match, however, it may be misleading to indicate multiple matches with the searched database.

Therefore, logical matches may be accounted for and the identity fraud potential indicator may be appropriately adjusted.

TABLE 1

Search rules for Identity Searching.

| Search Rule Identifier | Matching Item in Request Data | Database |
|---|---|---|
| S-1 | Involved person | Company historical requests |
| S-2 | Involved person | Industry database |
| S-3 | Involved person | SIU |
| S-4 | Involved vehicle(s) | SIU |
| S-5 | Involved vehicle(s) | Industry database |
| S-6 | Address of involved business | Commercial mailbox |
| S-7 | Involved business | Industry database |
| S-8 | Address of involved person | Commercial mailbox |
| S-9 | Address of involved business | Watch List |
| S-10 | Vehicle | Company historical requests |
| S-11 | Involved business | Sanctioned medical providers |
| S-12 | Address of involved person | Watch List |

In various embodiments, search rules may be created and used with requests when performing searches. For example, Table 1 provides a summary of an embodiment of search rules that may be used to search request data elements. Different search rules may also be used. The "Matching Item in Request Data" refers to a request data element that may match or approximately match a database of insurance data. An "Involved Person" is a particular person related to the request, for example, a claimant. A "Vehicle" refers to a particular vehicle related to a request, for example, a vehicle involved in an accident. An "Involved Business" refers to a particular business related to a request, for example, a medical provider or vehicle repair shop. An involved vehicle or business may also be referred to as an "involved object." In some embodiments, the fraud potential indicator assessed for a match of a request data element to a database may be different for an involved party, an involved business, or an involved object.

In some embodiments, search rules may be provided to search data from a check. For example, the drawer may be compared to people listed in a hot check database. Other check data may also be searched for suspicious circumstances. In some embodiments, data related to a loan may be searched. For example, the loan applicant's name may be searched for in established databases of past fraudulent loan applications. Other data related to a loan may also be searched for indications of the possibility of fraud.

In some embodiments, for a given search rule a formula may be used to determine the fraud potential indicator for a request. A formula may be based on several factors, such as, but not limited to, the number of matches of request data to a database. Additional factors may include a loss type, ranking, point weight, and/or adjustment numbers. A loss type may take into account the fact that certain types of requests tend to be associated with a higher rate of fraud. Request types that are unusual or are difficult to verify are examples of such requests. For example, stolen vehicle requests may tend to have a higher incidence of fraud than certain types of collisions. In some embodiments, the fraud potential indicator for a rule may be calculated by multiplying the number of matches by a ranking, point weight, an adjustment number and/or a numerical value associated with a loss type. For example, a fraud potential indicator may be assigned based on a formula such as, but not limited to:

Fraud potential indicator=Ranking*Point Weight*Loss Type Value*number of matches found in the database*adjustment number Other formulas may also be used. In some embodiments, fraud potential indicators may be scored differently depending on whether the person, vehicle, or business matched a database. In various embodiments, the following corresponding formulas may be used. Other formulas are also contemplated.

TABLE 2

Search Rule Corresponding Formulas.

| Search Rule Identifier | Formula |
|---|---|
| S-1 | 4 * 2.5 * loss type value * No. of matches in database * .15 |
| S-2 | 5 * 13.5 * loss type value * No. of matches in NICB * .15 |
| S-3 | 5 * 11.5 * loss type value * No. of matches in SIU * .15 |
| S-4 | 5 * 12.5 * loss type value * No. of matches in SIU * .15 |
| S-5 | 5 * 13.5 * loss type value * No. of matches in NICB * .15 |
| S-6 | 4 * 14 * loss type value * No. of matches in database * .15 |
| S-7 | 4 * 13.5 * loss type value * No. of matches in NICB * .15 |
| S-8 | 5 * 13.5 * loss type value * No. of matches in database * .15 |
| S-9 | 5 * 13.5 * loss type value * No. of matches in Watch List * .15 |
| S-10 | 2 * 3 * loss type value * No. of matches in database * .15 |
| S-11 | 5 * 13.5 * loss type value * No. of matches in database * .15 |
| S-12 | 5 * 13.5 * loss type value * No. of matches in Watch List * .15 |

In some embodiments, a search for an involved party in a database may involve a search for the involved parties' names, addresses, home phone numbers, work phone numbers, etc. In some embodiments, a search for an involved vehicle may include search for a Vehicle Identification Number (VIN#) and/or a license tag number. In other embodiments, a search for an involved business may include a search for a business name, a "doing business as" name, an address, business phone number, etc.

Search rules S-1 and S-10 (from Table 1) both involve comparisons of request data to a company historical requests database. In some embodiments, the frequency of previous requests by an involved person or a particular vehicle may be indicative of fraud, even if the prior requests were not suspicious.

Search rules S-2, S-5, and S-7 (from Table 1) involve comparisons of request data to an industry database such as the NICB database. A new request may be suspicious if it involves an individual or business that has been investigated previously by an industry organization such as the NICB. Similarly, a request may be suspicious if it involves a vehicle involved in a prior suspicious request. In these cases, the potential for fraud increases if such matches exist. Additionally, there may be a connection between the owner or prior owner of the vehicle involved in an accident and a new claim.

Search rules S-3 and S-4 both involve comparisons of request data to an SIU database. A new request may be suspicious if it involves an individual or vehicle that has been investigated previously by an SIU. The potential for fraud in a new request may be increased in these cases.

Search rules S-6 and S-8 both involve matches of request data to a commercial mailbox database. There may be legitimate reasons for people to use commercial mail receiving agencies (CMRA) as their private mailbox. However, it is not uncommon for people or businesses to use CMRAs to disguise themselves for various reasons. CMRAs offer some degree of anonymity and distance from their true place of residence. CMRAs are also used to prevent insurance companies from attributing previous accident history to their real address in order to lower insurance premiums. If a person uses a CMRA address with respect to an insurance claim, especially if the address is written as if it is a suite or apartment, it may be important to ascertain the true address of the person.

Search rules S-9 and S-12 both involve comparisons of request data to a watch list database. SIU investigators and/or insurance company management may gather intelligence data from law enforcement, other carriers, and/or from personal experience concerning individuals or business that may be involved in fraud. Search rules S-9 and S-12 allow suspicious entities to be entered directly into a watch list database for comparison to new requests data. In some embodiments, the author of an item on the watch list may be notified of any matches.

Search rule S-11 involves comparisons of request data to a sanctioned medical provider database. Medical providers or medical businesses that have been disciplined for questionable business practices may be entered in this database. Matches from a new request to a medical provider in a sanctioned medical providers database may indicate a potential for fraud in the new request.

Figure 4B:
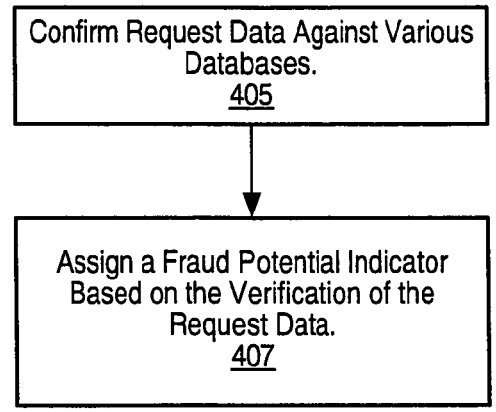
FIG. 4b illustrates a flowchart of a method for detecting a potential for fraud in a request using an identity verification, according to an embodiment

In various embodiments, the potential for fraud in a request may be assessed using an identity verification technique, as seen in FIG. 4b, to verify the identification of various individuals and businesses involved in the request. At 405, a request data element may be verified against various databases. For example, the insured, claimant, doctors, lawyers, and other individuals may be verified by searching public records and bills (e.g., phone bills) to verify that the information provided for each of these individuals and businesses in the request corresponds to an actual individual or business's name. At 407, a fraud potential indicator may be assigned based on whether the verification was successful. In some embodiments, the level of the fraud potential indicator assigned may depend on the number of request data elements that could be verified. In some embodiments, identity verification may also be used to meet compliance requirements in various state and federal laws.

Figure 5:
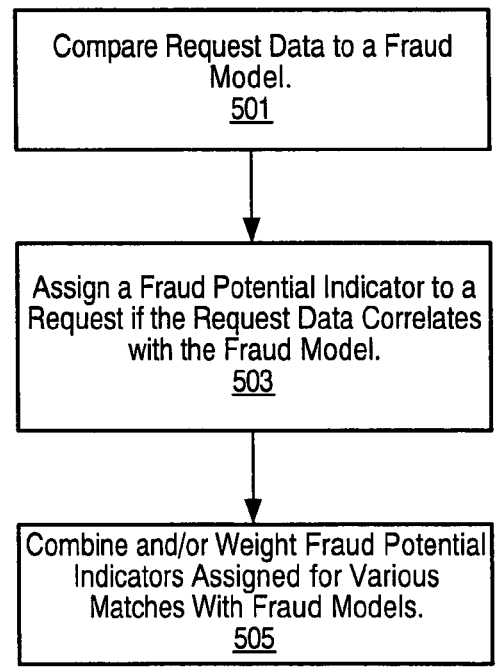
FIG. 5 illustrates a flowchart of a method for detecting a potential for fraud in a request using predictive modeling, according to an embodiment.

FIG. 5 illustrates a flowchart of an embodiment of a method for assessing a fraud potential indicator for a request by predictive modeling. At 501, request data may be compared to at least one fraud pattern (also called a fraud model) to search for similarities between the request data and fraud patterns. At 503, a fraud potential indicator may be assigned to a request based on similarities between request data and a fraud model. In some embodiments, the fraud potential indicator may be a numerical value associated with a type of fraud pattern. The fraud potential indicator may be based on expert knowledge of insurance claims and/or fraud assessment. At least one fraud pattern may be associated with an indication of fraud. In certain embodiments, a fraud potential indicator may be assigned based on a match between the request data and at least one characteristic of a fraud pattern. In some embodiments, a fraud potential indicator may be weighted according to the nearness of a match or approximate match. In some embodiments, an exact match may indicate a higher potential for fraud than an approximate match.

In some embodiments, a fraud pattern used in predictive modeling may be established using historical data obtained from requests in which fraud was previously identified. In some embodiments, a fraud model may include relationships between parties relating to the request and/or request data. For example, a fraud model may include the characteristics of a suspicious accident such as a staged rear-end collision.

As another example, if a worker's compensation claim is filed for an accident that took place at work on a Monday morning without any witnesses, the claim may be assigned a relative fraud potential indicator. In this example, a request may be compared to a predictive model using these request elements:

a) Accident occurred in the morning; and
b) No witness present.

As another example, circumstances may indicate a "swoop and stop" type fraud. In this case, a request for a rear end collision with a match for a sanctioned doctor for the claimant may be assigned a relative fraud potential indicator. Other circumstances may also be detected.

At 505, one or more predictive modeling fraud potential indicators may be combined and/or weighted if appropriate to obtain a total predictive modeling fraud potential indicator for the request. In some embodiments, one or more predictive modeling fraud potential indicators may be assigned a weighting. In such an embodiment, the weighted fraud potential indicators may be combined to obtain a total predictive modeling fraud potential indicator for the request.

Figure 6:
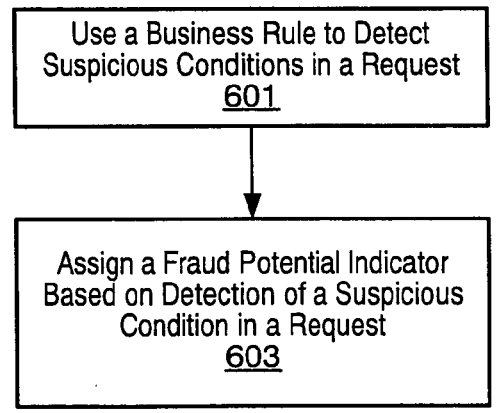
FIG. 6 illustrates a flowchart of a method for detecting a potential for fraud in a request using business rules, according to an embodiment.

FIG. 6 shows a flowchart of an embodiment of a method of assessing a fraud potential indicator for request data using business rules.

At 601, a business rule may be used to detect suspicious conditions in a request. For example, in various embodiments, business rules may be used to analyze the injury type, the loss type, the existence of a police report, who reported the request, and the number of vehicles involved. In some embodiments, business rules may be used to compare the date of loss to the date of the report of the request, the policy inception date to the date of loss, and the policy expiration date to the date of the report. Business rules may also be used to search for other conditions in a request that may indicate fraud.

For example, the type of injury involved and the number of injuries may indicate whether the request is likely to be fraudulent. In some embodiments, serious or visible signs of injury in the request may be contra-indicative of fraud, but soft-tissue or other non-visible complaints of injuries (especially by numerous passengers) may be indicative of possible fraud. In various embodiments, a business rule may apply a multiplier to a fraud potential indicator based on the injury type. In an embodiment, the injury type multipliers may be applied for the corresponding injury types (multiple injury types may be added together). For example:

Minor Injury (superficial/abrasion/contusion)=1.8
Fractures/Dislocations=0
Puncture Wounds/laceration=0
Fatality=−15
Neck and/or back soft tissue injury=2.2
Neck Only Sprain/Strain=2.2
Permanent Brain Damage =−10
Loss of Body Part=−0
Paralysis/Paresis =−15
Loss of Sense=3
Dental=1.6
Psychological Condition=3
No Visible Injury=1.8
Burns=0

In some embodiments, a formula such as, but not limited to, fraud potential indicator=(multiplier)* (cumulative injury type multipliers) may be used to assign the fraud potential indicator. In some embodiments, multiplier may be a user supplied number based on different aspects of the request. In some embodiments, negative injury type multipliers may be assigned to injury types (e.g., fatality) that are contra-indicative of fraud. In some embodiments, higher values may be assigned to injury types more indicative of fraud (e.g., soft tissue injuries).

In some embodiments, the loss type may indicate fraud. For example, request types that are unusual or difficult to verify may indicate more potential for fraud. In various embodiments, a loss type multiplier may be applied (multiple loss types may be added). For example:

Failure to Yield=7
Hit and Run=12
Over Center/Head on/Side Swipe=5
Single Vehicle Collision=7
Insured Failed to Obey Rules and Regulations=5
claimant's Unattended Vehicle Rolled Causing Collision=5

Other multipliers may also be used.

In some embodiments, the date of loss (e.g., accident) versus the date of the report of a claim may be used to detect potential for fraud. Claims tend to be reported by parties involved in an accident shortly after the date of loss. A delay in reporting may be an indication that facts relating to an accident may be fabricated. In some embodiments, the longer the delay between date of loss (DOL) and the date of report (DOR) to a requests organization, the greater the potential for fraud in a request. In some embodiments, the fraud potential indicator of the DOL vs. DOR business rule may be combined with a loss type value. For example, DOL vs. DOR fraud potential indicator may be multiplied by a loss type value. The fraud potential indicator may also be weighted by a ranking factor.

In some embodiments, the policy effective date versus the date of loss may indicate fraud. There may be a significant correlation between the likelihood of fraud and a short time frame between the policy inception date and the DOL. Fictitious circumstances tend to accompany such requests since the true date of loss may be just prior to a decision to purchase insurance. In some embodiments, as the number of days increases between policy inception date and DOL the chance of the request being false decreases. The trend may be reflected in a fraud potential indicator.

In some embodiments, the fraud potential indicator associated with policy effective date vs. DOR fraud potential indicator may be combined with a fraud potential indicator of the loss type value. For example, the fraud potential indicators may be multiplied together. In certain embodiments, the fraud potential indicator may be combined with a ranking factor. In some embodiments, the time period between policy inception date and DOL may be divided into a set of ranges. In some embodiments, a fraud potential indicator may be associated with one or more of such ranges. In some embodiments, the fraud potential indicator for the policy inception date vs. DOL fraud potential indicator may be set to approximately zero if there was policy renewal.

In some embodiments, the policy expiration date versus the date of report of loss may be a fraud potential indicator. There tends to be a significant correlation between the likelihood of fraud and a report of a request occurring after the policy expiration date. Typically, requests tend to be reported within the policy period and as close to the DOL as possible. In some embodiments, requests reported on or near the policy expiration date or within weeks afterward are suspicious and may have an increased potential for fraud.

In some embodiments, the absence of a police report may be an indication of fraud. Police reports often accompany insurance claims, except for very minor issues. When an accident or theft occurs and the police are not called, there may be an increased potential for fraud. In some embodiments, a fraud potential indicator from a no police report business rule may be combined with (e.g., multiplied by) a ranking factor if other indications of fraud are present. In some embodiments, a fraud potential indicator may be multiplied by 0 if a police report was filed and 2 if the police report was not filed. Other multipliers may also be used.

In some embodiments, the identity of the person who made the request may be an indication of fraud. In some embodiments, a fraud potential indicator may be assigned based on who and how the request was initially made. For example, if an attorney or public adjustor reports a property damage only claim, there may be an increased potential for fraud. In some embodiments, it may be less suspicious when an insured person reports the request.

In some embodiments, the number of vehicles involved in an accident may be an indication of fraud for an insurance claim. In some embodiments, the number of vehicles involved in an accident may be both an indication of fraud and a counter-indicator of fraud depending on the circumstances. For example, accidents involving more than two vehicles tend to be more difficult to stage, and therefore, may be less likely to be fraudulent. In some embodiments, a multi-vehicle accident may have a negative contribution to the fraud potential indicator for a request. However, single vehicle accidents may have a greater potential of being fraudulent. In some embodiments, the fraud potential indicator associated with the number of vehicles involved may be combined with (e.g., multiplied by) a ranking factor if other indications of fraud are present. In some embodiments, if using formulas, multiple vehicle accidents may be assigned negative multipliers.

In some embodiments, the length of time between the date a check was written and the date that the check is cashed may be an indication of fraud. In some embodiments, inconsistent loan data may be an indication of fraud. For example, an application that indicates a person has a low salary, but very high liquid assets value may have a higher potential for fraud. In addition, other circumstances about a request may be analyzed using business rules. For example, loan data may be used to determine the amount of money an applicant may be loaned under the "28/36" rule for mortgages. In some embodiments, a loan applicant's income may be compared to his assets. Other circumstances may also be investigated.

In various embodiments, a user may be allowed to create one or more user-defined (i.e., custom) business rules. A custom business rule may include information from the user for assessing a fraud potential indicator for a request.

At 603, a business rule may be used to assign a fraud potential indicator to at least one request. In some embodiments, a business rule may be designed to detect suspicious circumstances reported in a request and used to assign an appropriate fraud potential indicator to the request.

In various embodiments, business rule fraud potential indicators may be combined to obtain a total business rule fraud potential indicator for the request. For example, if circumstances match two different business rules, a higher fraud potential indicator may be assigned. In some embodiments, at least one business rule fraud potential indicator may be weighted. In various embodiments, weighted business rule fraud potential indicators may be combined to obtain a total business rule fraud potential indicator for the request.

Figure 7:
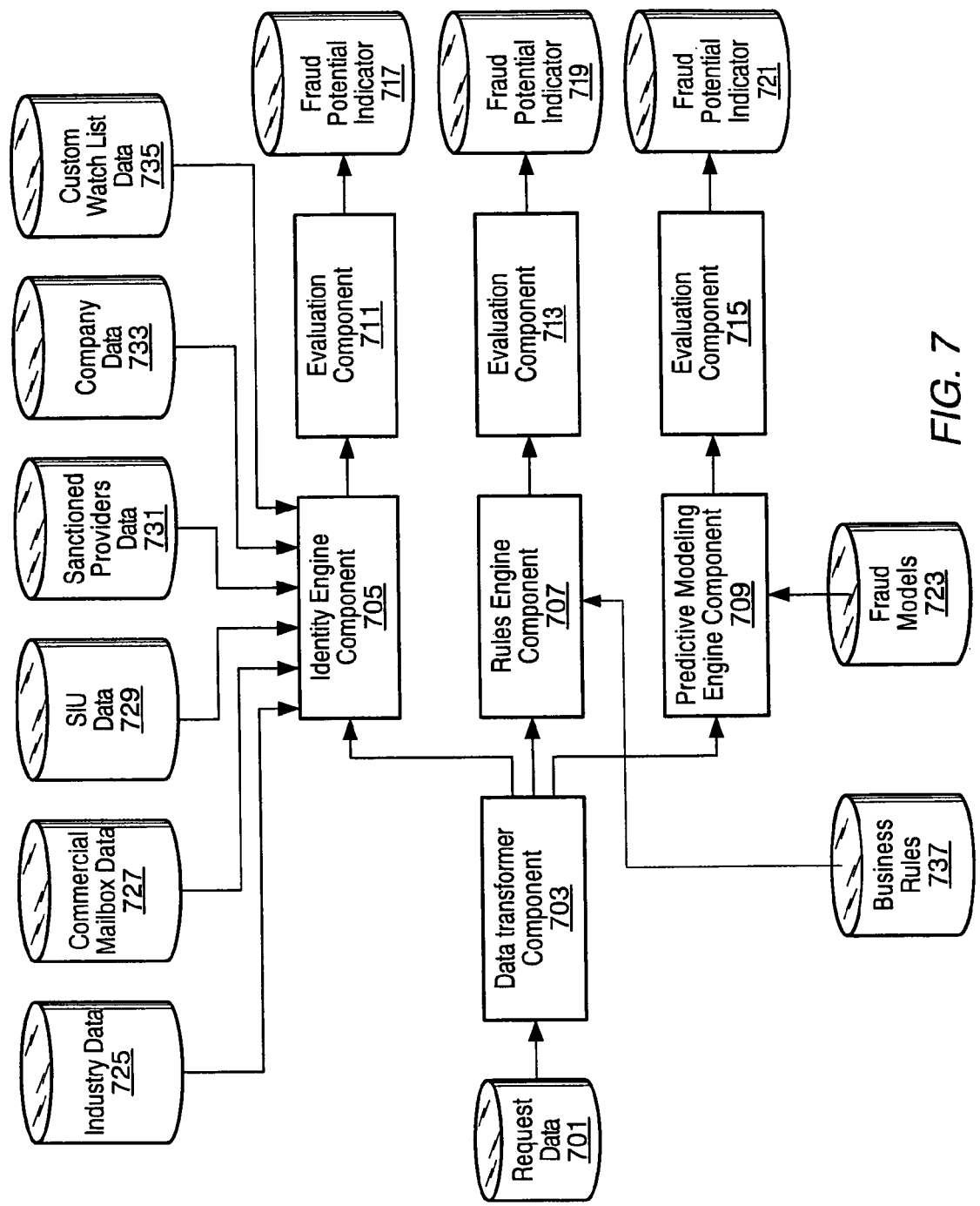
FIG. 7 illustrates a system using an identity search engine, a rules engine, and a predictive modeling engine, according to an embodiment.

FIG. 7 illustrates an embodiment of software components for performing fraud analysis. An embodiment of a system for assessing the potential for fraud in an insurance claim may include a plurality of software components. A software component may perform at least a portion of a method for assessing the potential for fraud in an insurance claim. Request data 701 may be stored in at least one database. The request data 701 may be obtained from a variety of sources. The sources may include, but are not limited to, an insurance policy, accident reports, parties related to the request, insurance adjusters, insurance fraud investigators, etc. In some embodiments, request data 701 may be processed for assessment of the potential for fraud by at least one software component. Data transformer component 703 may extract information from the request data 701 that may be relevant to assessing the potential for fraud in an insurance claim. Data transformer component 703 may then create a request data file in a desired format using the extracted data.

In some embodiments, identity engine component 705 may be used to assign at least one fraud potential indicator 717 for request data 701. Identity engine component 705 may compare at least one request data element to various databases. In some embodiments, various databases may include, but are not limited to, insurance industry data 725, commercial mailbox data 727, SIU data 729, sanctioned medical providers data 731, company requests data 733 and/or custom watch list data 735. Identity engine component 705 may assess similarities between (e.g., matches or approximate matches of characteristics) request data 701 and the various databases. A fraud potential indicator 717 for the request data 701 may be evaluated from the similarities by evaluation component 711. In some embodiments, identity engine component 705 may evaluate a fraud potential indicator 717 directly.

In some embodiments, Identity Systems (IDS) from Search Software America (SSA) of Old Greenwich, Conn. may be used with the identity engine component 705. SSA IDS performs searching, matching, and duplicate discovery for many forms of identification data. SSA IDS transparently maintains its own high performance "fuzzy" indexes, and de-normalized tables. SSA IDS also compensates for variation, spelling, keying, and word sequence errors in names, addresses and identity data regardless of country, language or character set. SSA IDS also supports searches of aliases, former names, compound names, prior addresses, multiple dates of birth, identity, phone numbers, etc.

In some embodiments, rules engine component 707 may assess at least one fraud potential indicator 719 for request data 701. Rules engine component 707 may compare at least one request data element to at least one business rule 737. As used herein, a "rules engine" may include an expert system, which is operable to produce an output as a function of a plurality of rules. A rules engine component 707, in some embodiments, may include an expert computer system that utilizes and/or builds a knowledge base in the form of business rules and/or formulas 737 to assist the user in decision-making. In some embodiments, rules engine component 737 may include rules based on expert knowledge for assessing the potential for fraud in an insurance claim. In some embodiments, the Visual Product Modeling System (VP/MS) from Computer Sciences Corporation in El Segundo, Calif. may be used in rules engine component 707. In some embodiments, the fraud potential indicator 717 for a request may be assessed by rules engine component 707 or evaluation component 713.

In some embodiments, predictive modeling engine component 709 may assess a fraud potential indicator 721 for request data 701. In some embodiments, predictive modeling component 709 may develop fraud patterns (or "fraud models 723") from historical request data associated with fraudulent requests. In some embodiments, predictive modeling component 709 may compare at least one request data element to at least one fraud model 723. In some embodiments, predictive modeling engine component 709 may assess similarities (e.g., matches or approximate matches) of at least one request data 701 to at least one fraud model 723. In certain embodiments, a fraud potential indicator 721 for the request may be evaluated by evaluation component 715 based on identified similarities. In an alternative embodiment, predictive modeling engine component 709 may evaluate a fraud potential indicator 721 directly.

As used herein, a predictive modeling engine component 709 may be operable to search for patterns in a group of historical data as a means of assessing future behavior. A predictive modeling engine 709 may discover previously unknown relationships among data. In some embodiments, predictive modeling component 709 may be used to detect suspicious relationships or fraud patterns among claimants, witnesses, medical providers, attorneys, repair facilities, etc. In some embodiments, predictive modeling engine component 709 may create and store a list of such fraud patterns 723 evaluated from past fraudulent request data. In some embodiments, Predictive Targeting System from Magnify of Chicago, Ill. may be used in predictive modeling engine component 709.

In various embodiments, other components may be used. For example, an administrative component may be added to allow a user to load information, values, thresholds, and other data for using the system. In some embodiments, the system may include links to relevant tools (e.g., websites with investigative tools). In some embodiments, links to information relevant to a user's usage of the system or workload may also be included. In some embodiments, references may be included for use by people such as, but not limited to, adjustors and investigators. In some embodiments, links to references may be included on a menu bar. For example, a link to the state of New York Insurance Manual may be included for access by an investigator who is investigating a claim in New York. As another example, a company's standard operating procedures could be linked. Other components are also contemplated.

Figure 8:
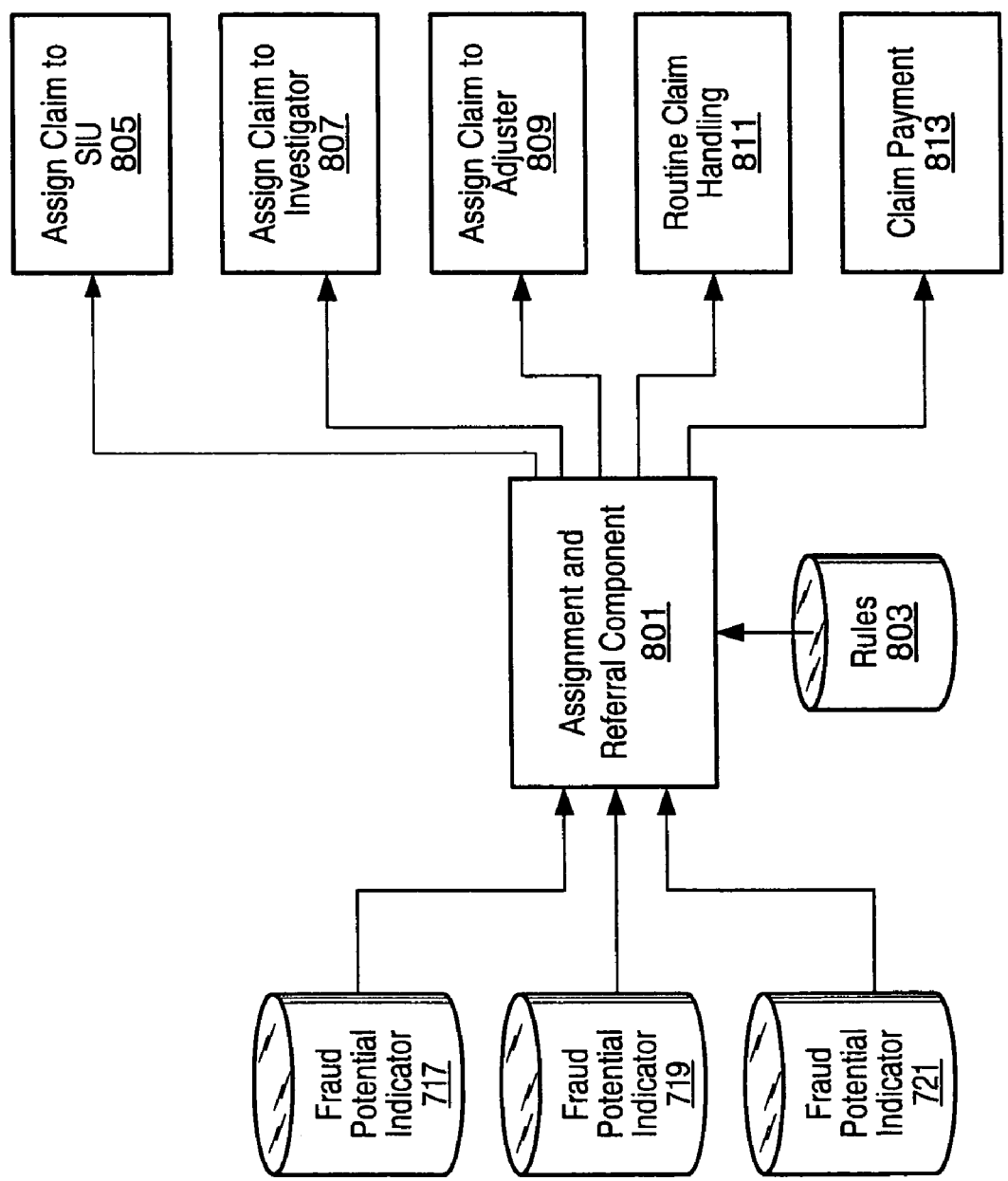
FIG. 8 illustrates a flowchart for assigning and referring requests, according to an embodiment.

FIG. 8. shows an embodiment of software components for assigning requests (e.g., claims) to investigators. While FIGS. 8-21 show embodiments in which the request is an insurance claim, FIGS. 8-21 may also be applied to other requests (e.g., checks and loans). In various embodiments, rules 803 may be used to analyze fraud potential indicators (717, 719, 721) assigned to a claim. In some embodiments, the fraud potential indicators may also be combined (e.g., by adding) and/or weighted according to rules 803. In some embodiments, rules 803 may be used by an assignment and referral component 801 to assign a claim to an SIU 805. For example, rules may analyze whether one or more fraud potential indicators (or the combined and/or weighted fraud potential indicator) are above a certain threshold to assign the claim to the SIU. In some embodiments, the rules 803 may be used to assign a claim to an investigator (e.g., if the fraud potential indicator(s) indicate a smaller likelihood of the claim being fraudulent than claims to be assigned to the SIU). In some embodiments, the claim may be assigned to an adjuster 809 for review. In various embodiments, if the fraud potential indicator(s) are not above a certain threshold (or are below a defined threshold), the claim may be assigned to routine claim handling. In some embodiments, if the fraud potential indicator(s) are low enough (e.g. negative) the claim may be paid 813 without further handling. In some embodiments, when a claim is referred for review, as in actions 805, 807, and 809, assignment and referral component 801 may notify at least one claims adjustor or an SIU investigator by e-mail of the status of the claim. In some embodiments, a user that has defined a custom profile relevant to a claim may be notified by e-mail.

In some embodiments, relative rankings for claims (also called a "status" of the claims) may be assigned based on a fraud potential indicator for the claim obtained from one or more of the fraud potential detection techniques. The status of a claim may be associated with a range of fraud potential indicators. For example, at least two ranges of fraud potential indicators may be defined. The ranges may provide a method of ranking claims in terms of relative fraud potential indicators. In certain embodiments, at least one of the ranges may be associated with an action regarding a claim. For example, a claims organization may consider a claim with a fraud potential indicator below a certain value to have a low probability of being fraudulent. Therefore, the claims organization may associate the range below a certain value with automatic or express payment of the claim. In a similar manner, a claim with a fraud potential indicator in a certain range may be associated with routine claim handling. A claims adjuster may be notified of the increased fraud potential indicator for a claim with a fraud potential indicator above a certain threshold. A claim with a fraud potential indicator greater than a threshold value (referred to herein as a minimum referral threshold) may be automatically referred for an investigation with a high level of scrutiny such as that performed by a special investigative unit (SIU) of a claims organization.

Some embodiments of a method for assessing the potential for fraud for claim data may include modifying at least one threshold value to obtain a selected volume of claims to investigate. For example, a minimum referral threshold may be modified or tuned to obtain a selected volume of referrals for further review.

In various embodiments, the claims may be ranked in order of likelihood of being fraudulent. An investigator may then investigate the claims in order with the most likely fraudulent claim first.

In certain embodiments, a system for assessing the potential for fraud in insurance claim data may allow adjusters and investigators to track and review referrals from any computer with Internet or company Intranet access. An adjuster or investigator may be allowed to display a summary list of all claims referred to that individual. The list of claims may be arranged in order of highest fraud potential indicator first. In other embodiments, the list may be sorted other ways, such as by referred date, by insured, by claim number, etc. In some embodiments, users of a system may also display claims that meet certain selected criteria. For example, the selected criteria may include, but are not limited to, a range of dates, a range of fraud potential indicators, claims referred to other investigators, or open claims.

In some embodiments, a system may allow a specific claim in a summary list to be reviewed in more detail by selecting the claim. A more detailed description of a selected claim may be displayed, including information regarding parties involved. In some embodiments, information that triggered the referral may be "flagged" with an icon. The icon may be selected to display a detailed description of reasons the information triggered the referral. In some embodiments, an investigator may pursue the claim further through standard investigation procedures of a claims organization.

In some embodiments, when claim data for a claim is updated the fraud potential indicator for the claim may be assessed again. If a new fraud potential indicator is higher than the previous fraud potential indicator, the claim may be reactivated (if inactive) and an investigator may be notified.

Figure 9:
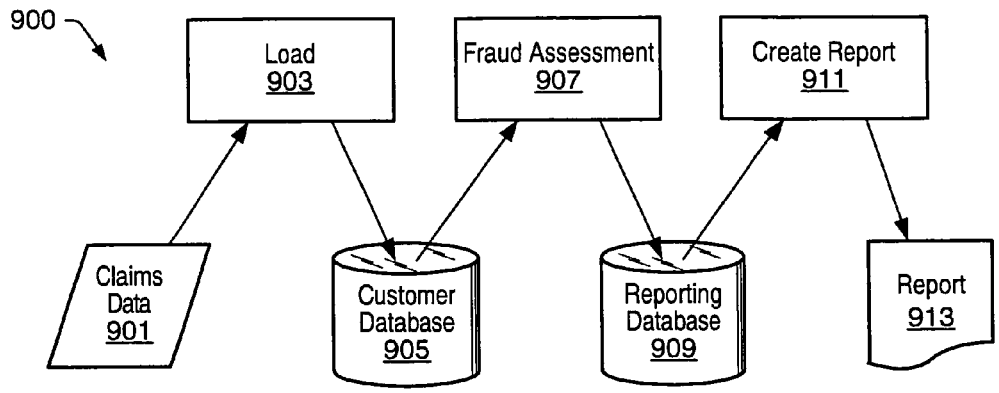
FIG. 9 illustrates a flowchart of a method for using request data to assess the potential for fraud in a request and report the potential, according to an embodiment.

FIG. 9 illustrates an embodiment of system 900 for assessing the potential for fraud in insurance claims. Claim data 901 may be imported or loaded 903 from an insurance company's claim data database to customer database 905. In various embodiments, the claim data may be imported in batches (e.g., claim data may be analyzed each night). In some embodiments, claim data may be imported in real-time. For example, as a claim is being made, the data may be analyzed and a potential for fraud may be assessed and communicated to the person taking the claim in real-time. In some embodiments, claim data 901 on customer database 905 may be accessed by a computer system that includes fraud assessment 907 software components. Results of fraud assessment 907 may be loaded onto reporting database 909. In some embodiments, report 913 of the fraud assessment results may be created 911.

Figure 10:
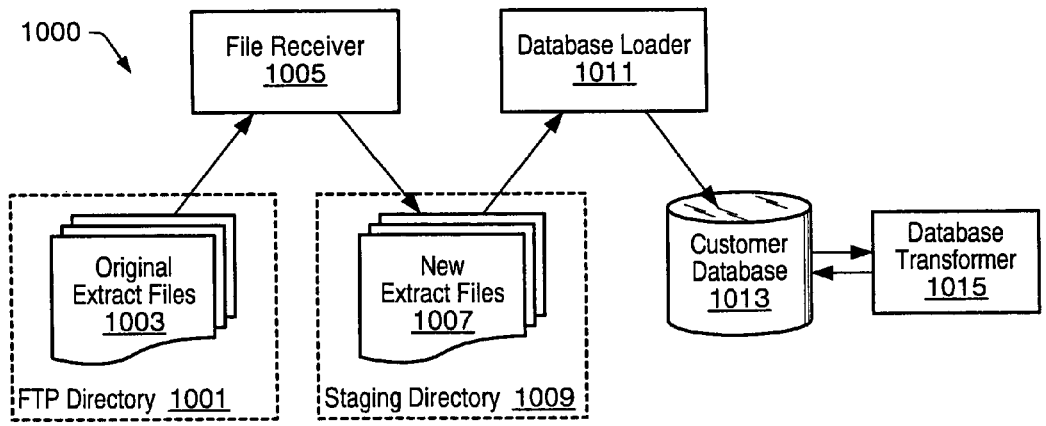
FIG. 10 illustrates a flowchart of a method for loading request data into a database accessible by a fraud assessment system, according to an embodiment.

FIG. 10 illustrates an embodiment of system 1000 for loading claim data from an insurance company database to a customer database. In some embodiments, system 1000 may receive periodic updates (e.g., nightly) of claim data from an insurance company's claim data database. Original claim data extract files 1003 may be loaded into FTP directory 1001 of system 1000 from an insurance company's claim data database. File receiver 1005 may monitor FTP directory 1001 for new extract files 1007. In some embodiments, file receiver 1005 may transfer new extract files 1007 to staging directory 1009 to minimize disk usage on the FTP server. In some embodiments, database loader 1011 may load copies of new extract files 1007 to customer database 1013. In certain embodiments, data transformer 1015 may translate claim data into a format suitable for fraud potential assessment.

In various embodiments, information about requests may be displayed in a browser format. In some embodiments, a user may login to a system to access information about a request. FIG. 11 illustrates an embodiment of a screen shot of claim summary window 1101 that displays claim information. Claim summary window 1101 may display information regarding involved vehicles 1103 and 1107, involved parties 1105 and 1109, and related parties 1111. Other information that may be displayed includes, but is not limited to, claim number, claim status, claim office, loss date, loss report date, type of report filed, who reported the claim, the claim type, an accident description, a location description, a policy number, a policy state, an inception date, number of renewals on the policy, effective date of the policy, and/or an expiration date of the policy. In some embodiments, a prior screen button 1113 may be provided to allow a user to navigate quickly between claim summaries.

Figure 12:
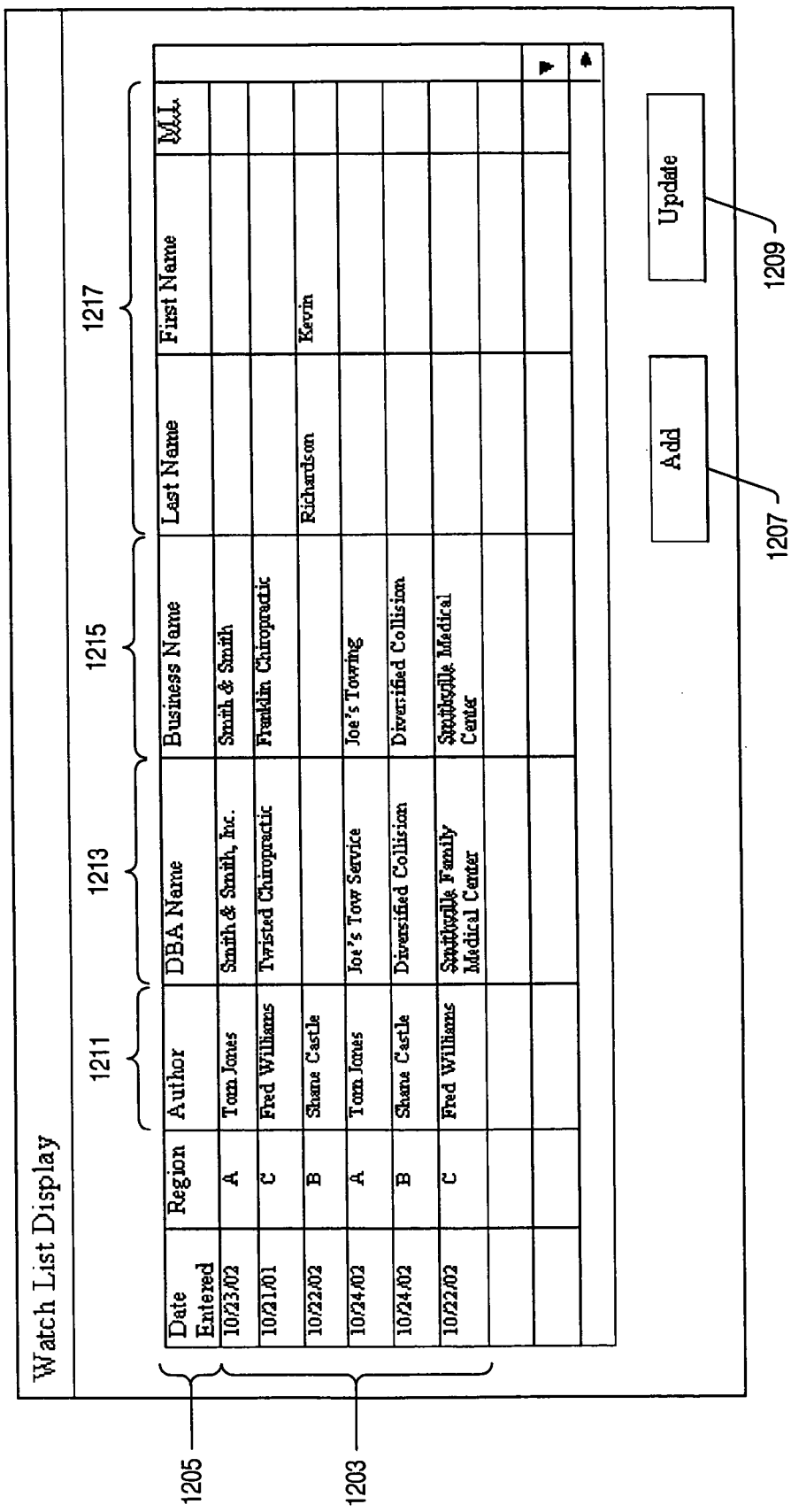
FIG. 12 illustrates a screenshot of a watch list, according to an embodiment.

FIG. 12 illustrates an embodiment of a screen shot of watch list display window 1201 that displays data from a watch list database. Watch list display window 1201 may include header row 1205 that describes various types of data relating to watch list entries in rows 1203. The types of data relating to watch list entries may include, but are not limited to author 1211 of the watch list item, DBA name 1213, business name 1215, and identity information 1217. In some embodiments, a user may select "Add" push button 1207 to add a new entry to the watch list display. In another embodiment, a user may select "Update" push button 1209 to update an existing entry. In some embodiments, the watch list screen may include tabs (not shown). For example, a tab may be presented for an individual and a tab may be presented for an organization. In some embodiments, selecting a tab may present information about respective individuals or organizations.

Figure 13:
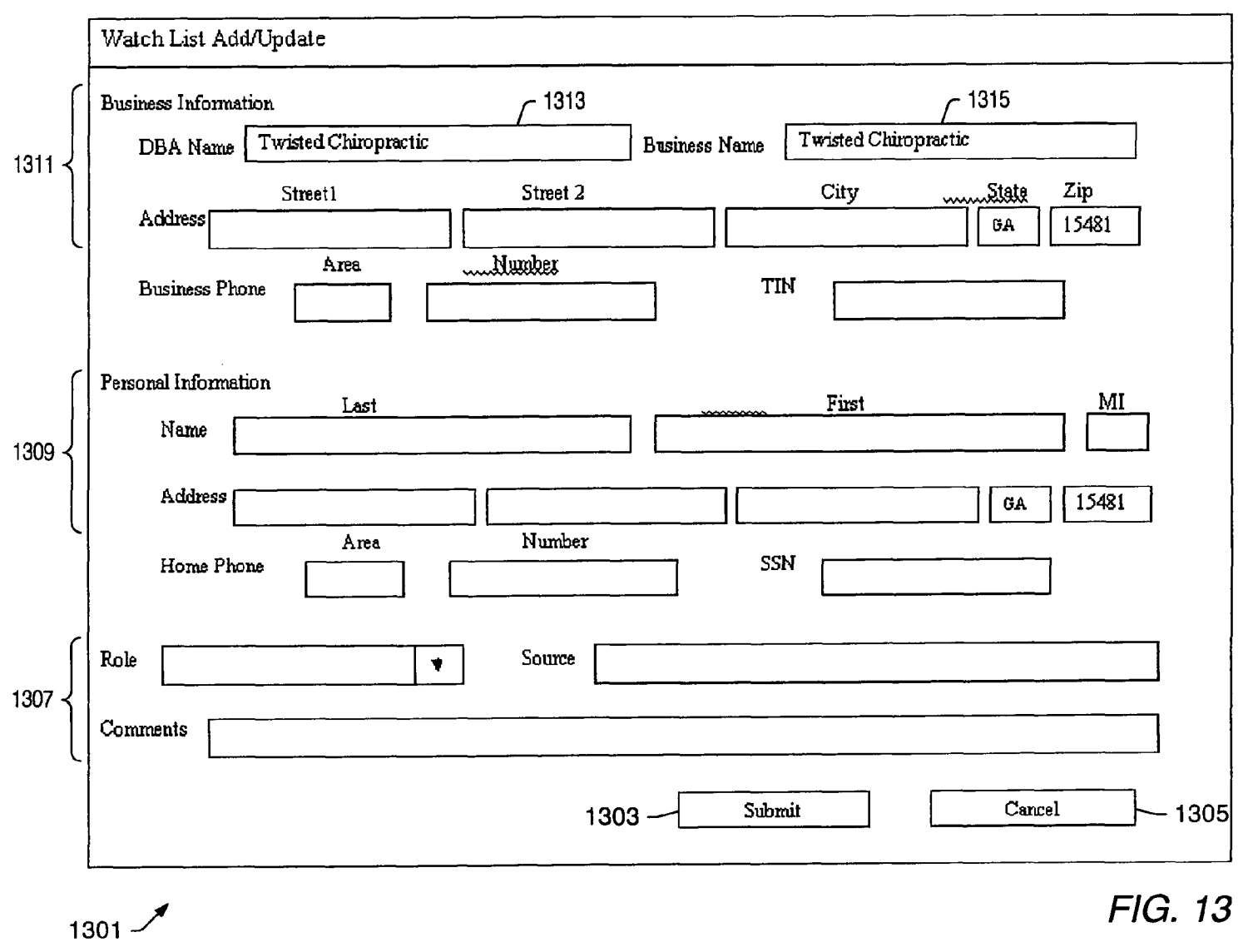

FIG. 13 illustrates an embodiment of a screen shot of watch list add/update window 1301. Watch list add/update window 1301 may display text boxes 1315 for adding or updating entries in a watch list database. A user may enter business information 1311, personal information 1309, and/or other information 1307 in watch list add/update window 1301. A user may select "Submit" push button 1303 to save the information entered. Alternatively, a user may select "Cancel" push button 1305 to disregard changes in information entered.

In some embodiments, a method may display at least two fraud potential indicators in a graphical user interface.

Figure 14:
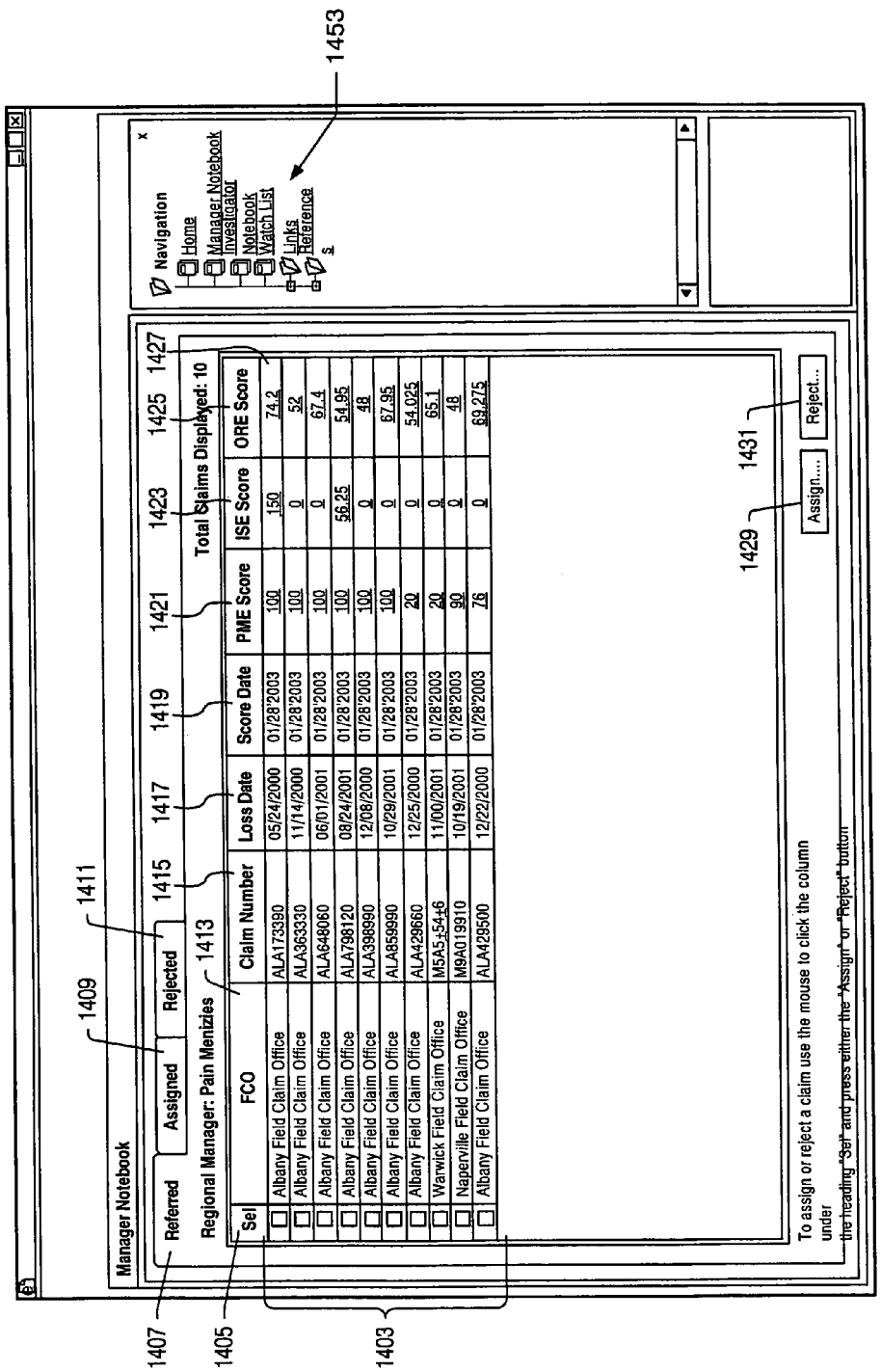
FIG. 14 illustrates a screenshot of a manager notebook with the referred tab selected, according to an embodiment.

FIG. 14 illustrates an embodiment of a screen shot of manager notebook window 1401 for displaying fraud assessment results. In some embodiments, manager notebook window 1401 may include referred tab 1407, assigned tab 1409, and rejected tab 1411. In some embodiments, when referred tab 1407 is selected, manager notebook window 1401 may display claims 1403 with fraud potential indicators that exceed a minimum referral threshold for at least one fraud potential detection technique. In some embodiments, if the assigned tab 1409 is selected, the user may be allowed to assign selected claims.

In an embodiment, the claim information shown may include selection 1405, field claim office (FCO) 1413, claim number 1415, loss date 1417, score date 1419 (date claim was scored by the fraud potential detection system), PME Score 1421 (e.g., predictive modeling fraud potential indicator), ISE Score 1423 (e.g., identity search fraud potential indicator), and ORE Score 1425 (e.g., business rules fraud potential indicator). In some embodiments, the selection check boxes 1405 may allow multiple claims to be selected at once. In some embodiments, clicking on claim number 1415 may bring up a claim summary screen. In some embodiments, clicking on a score in PME Score 1421 column, ISE Score 1423 column, or ORE Score 1425 column may bring up a summary screen displaying why the particular score was assigned (e.g., a list of matches may be displayed if an ISE Score in ISE Score 1423 column is selected).

In FIG. 14, referred tab 1407 is selected. In some embodiments, when assigned tab 1409 is selected, manager notebook window 1401 may display claims assigned to fraud investigators. In some embodiments, when rejected tab 1411 is selected, manager notebook window 1401 may display claims that have been rejected due to a high potential for fraud.

In some embodiments, manager notebook window 1401 may include column 1405 with checkboxes that allow a user to select a particular claim. Manager notebook window 1401 may further display column 1413 that includes the field claim office of a claims organization with which a claim is associated. In certain embodiments, when a user selects a fraud potential indicator for a claim in columns 1421, 1423, and 1425, a summary screen of the related fraud assessment may be displayed. For example, when a user selects fraud potential indicator 1427, a business rules fraud potential indicator summary screen may be displayed. In some embodiments, selecting an "assign" graphical component 1429 may navigate a user to an assignment screen that allows the user to assign selected (checked) claims to an investigator. In another embodiment, selecting a "reject" graphical component 1431 may allow a user to reject selected (checked) claims that have been referred. In some embodiments, a navigation menu 1453 may be included. The navigation menu 1453 may be used to quickly shift between different components (e.g., Home, Manager Notebook, Investigator Notebook, Watch List, Administration, Links, and References).

FIG. 15 illustrates an embodiment of a screen shot of a manager notebook window with the assigned tab 1409 selected. In some embodiments, with the assigned tab 1409 selected, the user may be allowed to see the claimant's last name 1501, claimant's first name 1503, field claim office 1505, claim number 1507, loss date 1509, score date 1511, number of days the claim has been assigned 1513, investigation status 1515 (e.g., an SIU investigation), and status of the claim 1517 listed with other claim data for each claim. In some embodiments, the claims may be organized respective to the information in a column by selecting the column (e.g., by clicking a label at the top of the column). In some embodiments, multiple claim categories may be selected. In some embodiments, claims may be selected using the selection column 1527. In various embodiments, other claim data may include the various scores assigned to the claim (e.g., PME Score 1519, ISE Score 1521, and BRE Score 1523). In some embodiments, a flag indicator may be displayed next to each score with a respective color depending on the severity of the score (e.g., a red flag for high, yellow flag for medium, and green flag for low). In addition, a column may be provided to indicate whether the claim is closed. In some embodiments, when assigning a claim, a display of investigators and their corresponding regions may be displayed. The claim may be assigned to an investigator in the same region the claim occurred in. In addition, in some embodiments, claims may be assigned to a region. For example, a claim assigned to a region may be assigned to a supervisory investigator for the region to be further assigned by that supervisory investigator. In some embodiments, if a claim has been examined by an investigator, it may not be reassigned or an error message may appear when a user attempts to assign the claim to alert the user that an investigator has already started investigating the claim. In some embodiments, a filter graphical component 1525 may be selected to change the criteria of the displayed claims. For example, a particular investigator may be selected and only the claims assigned to the selected investigator may be displayed.

FIG. 16 illustrates an embodiment of a screen shot of a manager notebook window with rejected tab 1411 selected. In some embodiments, if rejected tab 1411 is selected, the user may reject a claim. In certain embodiments, a Reject Reason dialog box may appear to allow the user to enter a reason why the claim was rejected. In some embodiments, a user may select from preformed reasons (e.g., Invalid BRE Score, Invalid ISE Score, Invalid PME Score, Low Score, Insufficient data, lack of evidence, manpower, no fraud, and liability). In some embodiments, pressing rejected tab 1411 may bring up a screen with rejected claims. For example, claims may be rejected manually by a claims adjuster, an investigator, or rejected automatically (e.g., if the score for the claim exceeds a threshold). Other reasons for rejecting a claim are also contemplated. In some embodiments, a rejected claim may be activated and assigned. In various embodiments, claims may be selected using the check boxes in Selection column 1633. In some embodiments, settings may be adjusted to adjust the number of days of rejected claims shown. In some embodiments, a rejected by column may display who rejected a claim. In some embodiments, FCO 1605, claim number 1607, loss date 1609, score date 1611, PME score 1619, ISE score 1621, and BRE score 1623 may be shown for each claim. In addition, in some embodiments, rejected reason 1625 may be displayed for each claim. In certain embodiments, the reason may be system generated or person generated. In various embodiments, the investigation status and whether the claim has been closed may also be displayed. In some embodiments, assign graphical component 1631 may be pressed to assign selected claims (e.g., using selection column 1633 to assign rejected claims). Other information may also be displayed (e.g., name of the regional manager 1635 and total number of claims displayed).

In various embodiments, other tabs may be used. For example, a New tab may be used to access information on claims that have not been assigned. In some embodiments, a user may use a New tab to access information on claims to be opened or reassigned back to a supervisor. In some embodiments, an Open tab may allow access to all open claims assigned to a particular investigator. In some embodiments, a Pending tab may be used to display claims in which the investigation is complete, but the claim is still pending.

Figure 17:
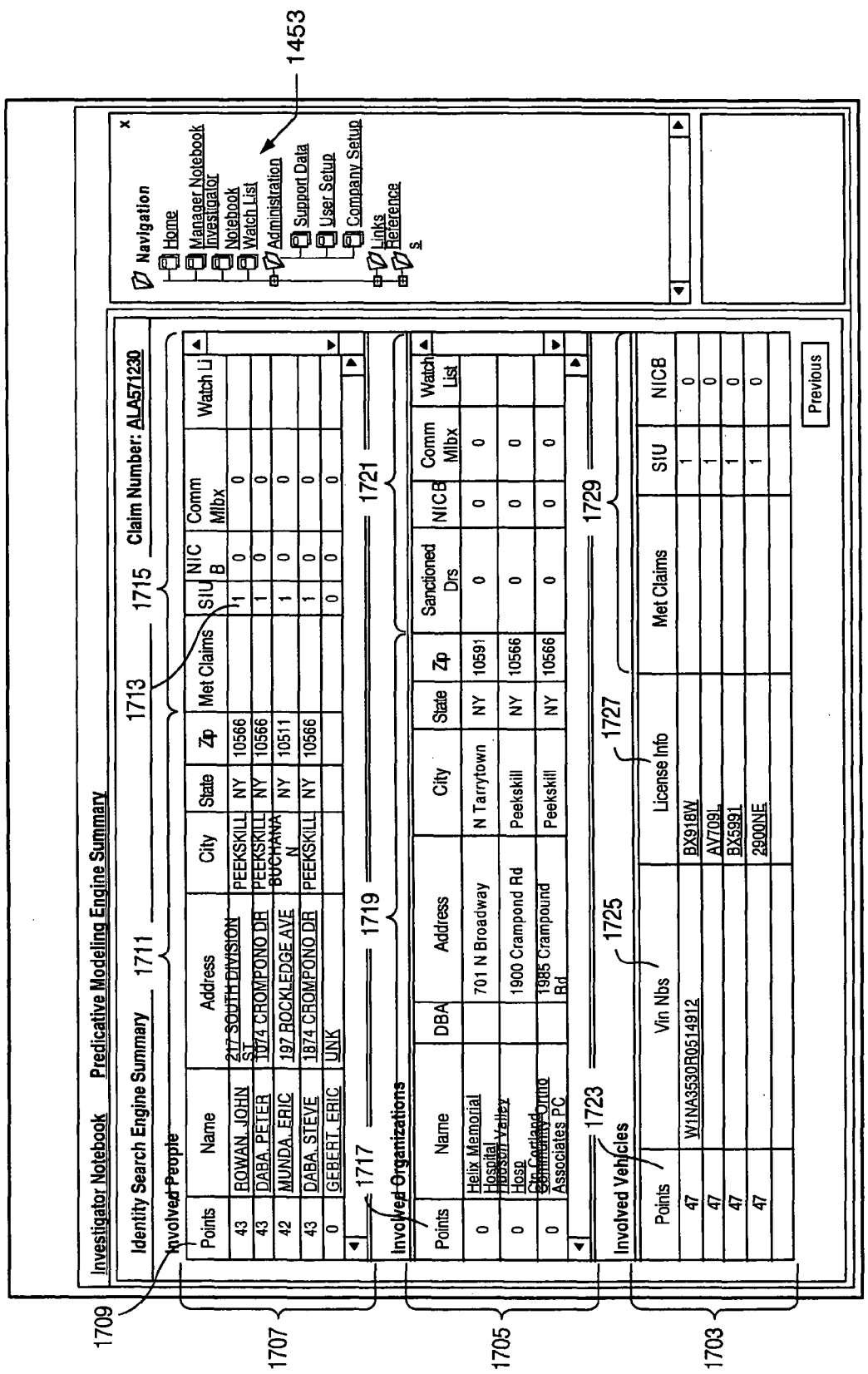
FIG. 17 illustrates a screenshot of an identity search engine summary, according to an embodiment.

FIG. 17 illustrates an embodiment of a screen shot of identity search fraud potential indicator summary window 1701. Identity search fraud potential indicator summary window 1701 may display fraud potential indicators for at least one party and/or object involved in a claim. In some embodiments, the fraud potential indicator due to at least one database for at least one party and/or object may be displayed. Identity search fraud potential indicator summary window 1701 may display fraud potential indicators for involved people 1707, involved organizations 1705, involved vehicles 1703, etc. In column 1709, fraud potential indicators assessed for involved parties may be displayed individually. Columns 1711 may include identifying information for at least one involved person. Columns 1715 may display a total fraud potential indicator from each searched database for an involved person. For example, fraud potential indicator 1713 may be the total fraud potential indicator for John Rowan based on an SIU database. In some embodiments, selecting a fraud potential indicator may navigate a user to an identity search results window, which may display matches of an involved person or object with at least one database. In column 1717, fraud potential indicators assessed for involved organizations may be displayed individually. Columns 1719 may include identifying information for involved organizations. Columns 1721 may display a fraud potential indicator for each searched database for an involved organization. In column 1723, fraud potential indicators assessed for involved vehicles may be displayed individually. Columns 1725 and 1727 may include identifying information of involved vehicles. Columns 1729 may display a total fraud potential indicator from each search database.

FIG. 18 illustrates an embodiment of a screen shot of identity search results window 1801. In some embodiments, identity search results window 1801 may display the fraud potential indicators and associated search matches of at least one involved person and/or object associated with a fraud potential indicator. For example, identity search results window 1801 may display the fraud potential indicators and search matches associated with at least one fraud potential indicator in Table 1. Summary 1805 may be displayed, for example, for the S-1 fraud potential indicator. Summary 1805 may display fraud potential indicator 1817, involved person 1815, and matches 1809 of involved person 1815 with a company historical database. Summary 1803 may be displayed, for example, for the S-2 fraud potential indicator. Summary 1803 may display fraud potential indicator 1813, involved person 1811, and matches 1807 of involved person 1811 with an industry database (e.g., NICB).

In various embodiments, tables may be presented in the identity search engine results screen to access information on which elements matched particular databases. For example, tables may be available for SIU, NICB, Sanctioned Doctors, Commercial Mailboxes, and Watch lists. In some embodiments, an indicator on a table may be selected to expand a selection on the table. For example, a "+" sign may be selected on a table to expand the information shown for an involved person, involved organization, and involved vehicle. In some embodiments, information shown for a person may include points from matches of the person to a database, the name of the person, the address of the person (including city, state, and zip code), the number of matches for this person in the claims database, the SIU database, the NCIB database, the Commercial Mailbox database, and the watch list database. In some embodiments, information shown for an involved organization may include points for matches the organization received, the name of the organization (including a DBA name), the address of the organization (including city, state, and zip code), and matches the organization received in the SIU database, the NICB database, the Commercial Mailbox database, and the Watch list database. In some embodiments, information shown for an involved vehicle may include points the vehicle received for matches in the database, the VIN number of the vehicle, the license information for the vehicle, and the number of matches for the vehicle in the claims database, the SIU database, and the NICB database. Other information, including other databases, may also be presented for other entities involved in a request.

Figure 19:
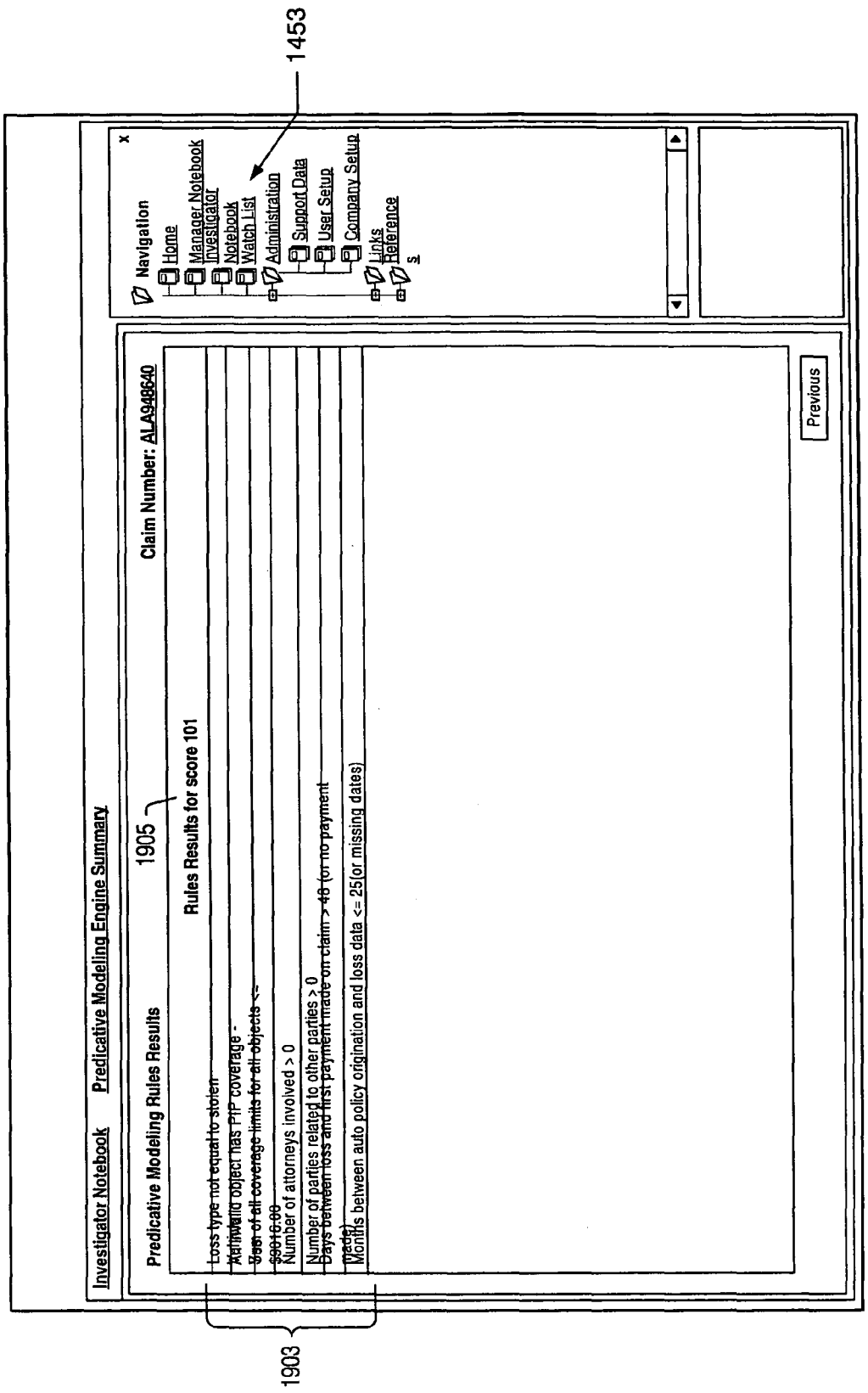
FIG. 19 illustrates a screenshot of predictive modeling engine summary results, according to an embodiment.

FIG. 19 illustrates an embodiment of a screen shot of predictive modeling fraud potential indicator summary window 1901. Predictive modeling fraud potential indicator summary window 1901 may be displayed, for example, when a user selects a fraud potential indicator in column 1421 in FIG. 14. Predictive modeling fraud potential indicator summary window 1901 may display total predictive modeling fraud potential indicator 1905 from a predictive modeling engine. In some embodiments, window 1901 may display factors 1903 that were considered in determining total fraud potential indicator 1905.

FIG. 20 illustrates an embodiment of a screen shot of business rules fraud potential indicator window 2001. In some embodiments, the screen shot may be displayed when the BRE score is selected in the claim summary screen. In some embodiments, business rules fraud potential indicator summary window 2001 may display at least one individual business rule fraud potential indicator used by the business rules engine to determine the total business rule fraud potential indicator. Column 2007 may include the fraud potential indicators for individual business rules. Column 2009 may include a description of business rules. Total business rules fraud potential indicator 2005 may include the overall fraud potential indicator determined by the business rules engine. In some embodiments, selecting an individual fraud potential indicator in column 2007 and/or a business rule description in column 2009 may display a business rule detail window. In some embodiments, accident description dialog box 2003 may be displayed in window 2001.

FIG. 21 illustrates an embodiment of a screen shot of business rules detail window 2101. In some embodiments, business rules detail window 2101 may be displayed, for example, by selecting an individual fraud potential indicator in column 2007 and/or a business rule description in column 2009 in window 2001 shown in FIG. 20. Business rules detail window 2101 may display the individual business rule fraud potential indicators for at least one business rule. Rows 2105 may each pertain to at least one involved person or object involved in the claim. Column 2111 may include a description of loss sustained by an involved person or object. Columns 2109 and 2107 may include identifying information of an involved person or object and the fraud potential indicator assessed due to the loss. Business rules fraud potential indicator 2103 for the business rule may be displayed in business rules detail window 2101.

Figure 22:
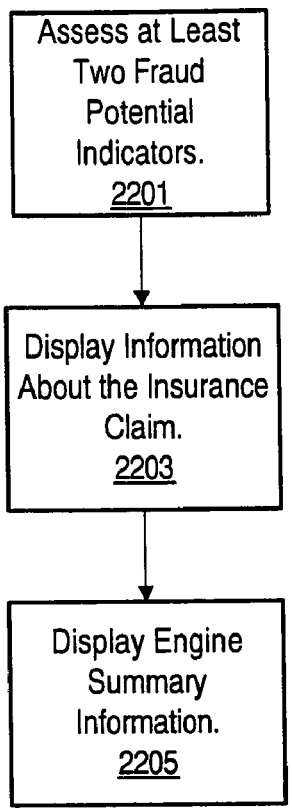
FIG. 22 shows a flowchart of a method for displaying summary information related to the various engines, according to an embodiment.

FIG. 22 shows a flowchart of an embodiment of a method for displaying summary information related to the various engines. At 2201, at least two fraud potential indicators for an insurance claim may be assessed using at least two of an identity search engine, a predictive model engine, and a business rule engine. At 2203, information about an insurance claim may be displayed including identifying information for the claim and the at least two fraud potential indicators for the insurance claim. At 2205, engine summary information related to at least one engine used to assign at least one of the at least two fraud potential indicators may be displayed.

In various embodiments, other summary screens may also be used. In some embodiments, an involved people summary screen may show a summary of involved people in a claim. In some embodiments, an involved people summary screen may be presented when a user selects an individual score on an identity search engine results screen. In some embodiments, tabs may be displayed for each involved person and accessing a tab may bring up information regarding how the involved person matched information related to the tab. For example, tabs may be presented for the SIU, NICB, commercial mailbox, watch list, and historical claims databases. In some embodiments, a name of a person associated with the selected individual score may be displayed as an anchor record of a tab. For example, selecting the SIU tab may present matches for the selected individual against the SIU database (e.g., the percentage of similarity between the matches, the claim number in the SIU database matched, the name, address, and phone numbers of the person matched). Other information may also be displayed depending on which database tab is selected (e.g., the NICB number for the matching NICB claim, the store name of the holder of the commercial mailbox, the identifier in the Watch list, and the claim number for the claim in the claims database matched).

Figure 23:
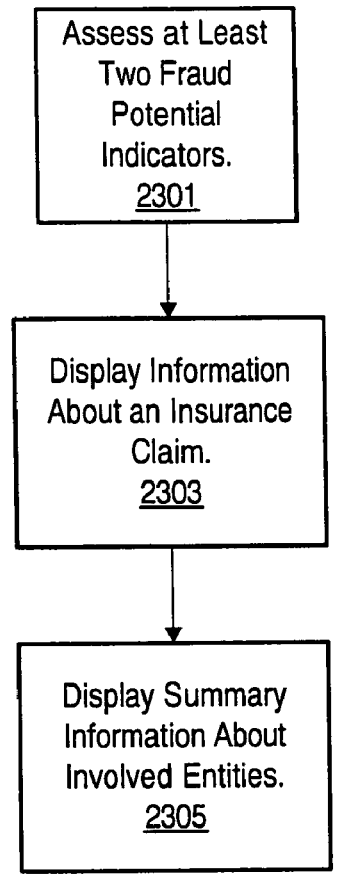
FIG. 23 illustrates a flowchart of a method for displaying summary information related to involved entities, according to an embodiment.

In some embodiments, summary screens may be shown for involved organizations, vehicles, and other entities. FIG. 23 illustrates a flowchart of an embodiment of a method for displaying summary information related to involved entities. At 2301, at least two fraud potential indicators for an insurance claim may be assessed using at least two of an identity search engine, a predictive model engine, and a business rule engine. At 2303, information about an insurance claim may be displayed including identifying information for the claim and the at least two fraud potential indicators for the insurance claim. At 2305, summary information related to an involved entity related to at least one assigned fraud potential indicator may be displayed. For example, an involved organization summary screen may be displayed if the score for the involved organization is selected in the identity search engine summary screen. In some embodiments, tabs may be presented in the involved organization summary screen for different databases searched. For example, tabs may be available for the sanctioned doctors database, the NICB database, and the commercial mailbox database. In some embodiments, information shown if a tab is selected may include the score for the percentage of similarity of the match, the name, address, and phone number of the match, and other information dependent on which database has been selected (e.g., identifier for the sanctioned doctor, NICB number, and store name for the commercial mail box).

In some embodiments, involved vehicle summary screens may be displayed by selecting the individual score for the involved vehicle in the identity search engine summary screen. In some embodiments, the involved vehicle summary screen may include tabs for various databases searched (e.g., the SIU database, the NICB database, the claims database, and the watch list database). In some embodiments, information about the match in the various databases (e.g., percentage of similarity of match, the VIN, the year, the make, the model, the license number, and the state may be displayed) may be presented along with database specific information (e.g., SIU claim number, NICB reference number, the claim number, and the watch list identifier).

In some embodiments, watch list summary screens may be provided for entities being tracked by a watch list. In some embodiments, users may keep track of where individuals and organizations are showing up in claims. For example, watch list individual summary and watch list organization summary screens may be used.

In various embodiments, support screens may also be used to show data about the system. For example, a support data screen may used to modify data in an administrative file. A user setup screen may be used to maintain and modify user information for users of the system (e.g., user's office, email address, and user group). A company setup screen may be used to maintain information about a company using the system.

Figure 24:
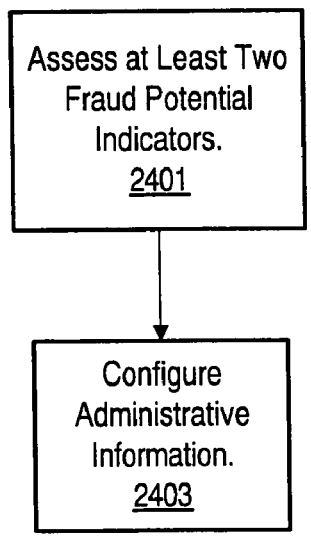
FIG. 24 illustrates a flowchart of a method for configuring administrative information for a fraud potential detection system, according to an embodiment.

In various embodiments, information used by the system may be maintained through an administrative interface. FIG. 24 illustrates a flowchart of an embodiment of a method for configuring administrative information for a fraud potential detection system. At 2401, at least two fraud potential indicators for an insurance claim may be assessed using at least two of an identity search engine, a predictive model engine, and a business rule engine. At 2403, administrative information for a system may assess at least two fraud potential indicators for an insurance claim. In some embodiments, country information (e.g., a country code and country name), state information (e.g., state abbreviations, name of state, region associated with the state, and country the state is a part of), and region information (e.g., region identifier, region name, and additional region information) may be updated, deleted, and/or maintained for countries, states, and regions used by the system. In some embodiments, information about a company (e.g., company name, company address, additional addresses, company city, company state, company zip code, and company country), office information (e.g., office name, office address, office city, office state, office zip code, office country, office email address, and office region) may be updated, deleted, and/or maintained for companies and offices used by the system. In certain embodiments, information for investigation status (e.g., a status code and respective investigation status description), closure reasons (e.g., closure identifier and respective closure reason), and reason rejected (e.g., a reason identifier and respective reason the claim was rejected) may be updated, deleted, and/or maintained for codes and identifiers used by the system. For example, after a closure identifier is set-up, a user may select a code for a closure reason instead of typing out a reason for each claim. Other information may also be updated, deleted, and/or maintained. For example, information about a role description (e.g., a role identifier and a description for the role identifier), information about a user group (e.g., a user group identifier and respective user group information), and information for a user set-up (e.g., user first name, user last name, user identifier, user phone number, user email address, user region, user office, number of days of claims displayed for the user, and user group associated with the user). In various embodiments, the information may be accessed using a navigation bar with directory trees for the information titles. In some embodiments, "+" signs next to a respective information title may be pressed to access corresponding directory information. Other selection methods may also be used.

In some embodiments, the system for assessing the potential of fraud in requests may present results of the assessment in several ways. FIG. 25 illustrates a flowchart of an embodiment of a method for displaying assessment results. At 2501, at least one fraud potential indicator for a plurality of insurance claims may be assessed using at least one fraud potential detection technique. At 2503, a minimum referral fraud potential indicator may be defined such that a desired quantity of requests are referred for further investigation. At 2505, a fraud potential indicator may be displayed in a graphical user interface. In some embodiments, at least two fraud potential indicators may be assessed for a request and displayed in a graphical user interface. At 2507, a ranking may be assigned to at least one request relative to a probability of fraud. In some embodiments, multiple requests may be listed according to their ranking. In some embodiments, an investigator may investigate the requests in order of ranking (e.g., a request with a high probability of fraud may be assigned a higher ranking, and thus be considered before, a request with a lower probability of fraud).

FIG. 26 illustrates a flowchart of an embodiment of a method for displaying information about requests using tabs. At 2601, at least two fraud potential indicators for an insurance claim may be assessed using at least two of an identity search engine, a predictive model engine, and a business rule engine. At 2603, information about an insurance claim may be displayed including identifying information for the claim and the at least two fraud potential indicators for the insurance claim. At 2605, a tab may be displayed. In some embodiments, selecting the tab may display information related to the claims associated with a reference on the tab selected (e.g., a tab may have the name of a searched database and link a user to matches detected between an insurance claim and the database).

In some embodiments, requests (e.g., insurance claims, financial transactions, insurance policy applications, etc.) may be automatically assigned to investigators. Investigators may further investigate requests. A user may access a request processing system. A request processing system may include an insurance claim processing system and/or a financial service organization system. A user may access a request processing system via one or more Internet protocols, such as TCP/IP and/or HTML. In an embodiment, a user may access a request processing system via a website coupled to a request processing system. A user may transmit one or more requests to the request processing system. A user may transmit the request via an XML message and/or to a database of the request processing system.

A request may include an insurance claim, a casualty loss claim, a property loss claim, a credit card transaction, a loan, and/or other financial transactions. A request may include one or more request data elements. A request data element may include the type of request, such as, but not limited to, automobile insurance claim, casualty loss claim, and/or financial transaction. In certain embodiments, a request data element may include, but is not limited to: claimant name; claimant address; vehicle information number; vehicle make and/or model; incident information such as time of accident, location of accident, and/or injuries in accident; insurance policy issuance date; insurance policy expiration date; credit score of claimant; location of insured; and/or amount of claim or request.

In some embodiments, requests may be automatically assigned based on a variety of factors. A request may be automatically assigned based on the type of request. For example, automobile insurance claims may be assigned to a set of investigators while life insurance claims may be assigned to a different set of investigators. Automobile insurance claims without casualty losses may be automatically assigned to an investigator from a different set of investigators than automobile insurance claims with casualty losses. A request may be automatically assigned based on preferences of an investigator. An investigator may prefer to investigate collision loss claims involving a personal injury. A request for an automobile insurance claim for an accident involving injury to a party may be automatically assigned to an investigator with a preference for this type of request over an investigator that does not prefer this type of request. A request may be automatically assigned at least partially based on where a request was filed. It may be advantageous to automatically assign a request to an investigator proximate the location of an accident and/or witnesses to an incident. It may be advantageous to automatically assign a request to an investigator located proximate the request filing location or to an investigator with experience in requests from a certain location due to varying state laws and/or familiarity with local courts. A request may be automatically assigned at least partially based on the value of a request. For example, business rules may prefer that an investigator with a predetermined experience level investigates requests, such as an insurance claim, over a predetermined amount. It may be advantageous to automatically assign high value requests to an experienced investigator to inhibit fraudulent requests from being processed and/or paid. In an embodiment, a request for an insurance claim may be automatically assigned to an investigator at least partially based on the value of the claim. In another embodiment, a request for a financial transaction may be automatically assigned to an investigator at least partially based on the value of the financial transaction.

In some embodiments, a request may be automatically assigned based on a predetermined set of skills an investigator needs to investigate the request. For example, when a request is processed by a request processing system, the request may be compared to a database that includes the set of skills an investigator needs to examine the type of request. The request processing system may then compare the needed skill set to the skill sets of available investigators and then automatically assign the request to an investigator that has at least the needed skill set. A request may be assigned to an investigator with the greatest skill set compared to other investigators. A request may be assigned to an available investigator with the greatest skill set related to the type of request when compared to other available investigators.

In some embodiments, it may be desirable to automatically assign requests based on experience levels of investigators. For example, requests may be assigned to any investigator in a set of investigators. Business rules may prefer that certain requests be investigated by investigators meeting a predetermined experience level. For example, for requests involving a high claim amount and casualty loss, it may be preferable to assign the request to the investigator with the most experience in high level claims and casualty losses. It may be preferable to assign the request to the investigator with the most experience that is also available (e.g., the investigator is not on vacation and/or the investigator does not have more than a predetermined number of requests).

A request may be at least partially processed on a request processing system. In some embodiments, one or more fraud potential indicators may be assessed for a request. A fraud potential indicator may be based on at least two of the following: a comparison of one or more request data elements to data in a database, a comparison of one or more request data elements to one or more fraud models, and an application of one or more business rules to one or more request data elements.

In certain embodiments, the request and/or a message may be transmitted to the assigned investigator. Also a message may be transmitted via one or more Internet protocols, such as TCP/IP and/or HTML. A request may be emailed to an investigator. A message may notify the investigator of the assigned request; include information about the request such as due date and/or claim amount; and/or include a fraud potential indicator assessed for a request. A message may be transmitted to an investigator after the request is assigned. In an embodiment, an investigator may be able to decline an assignment. In another embodiment, an investigator may not be able to decline an assigned request. An investigator may provide a reason for declining a request assignment. An investigator may be able to select, from a predetermined list of reasons, a reason for declining an assigned request.

Figure 29:
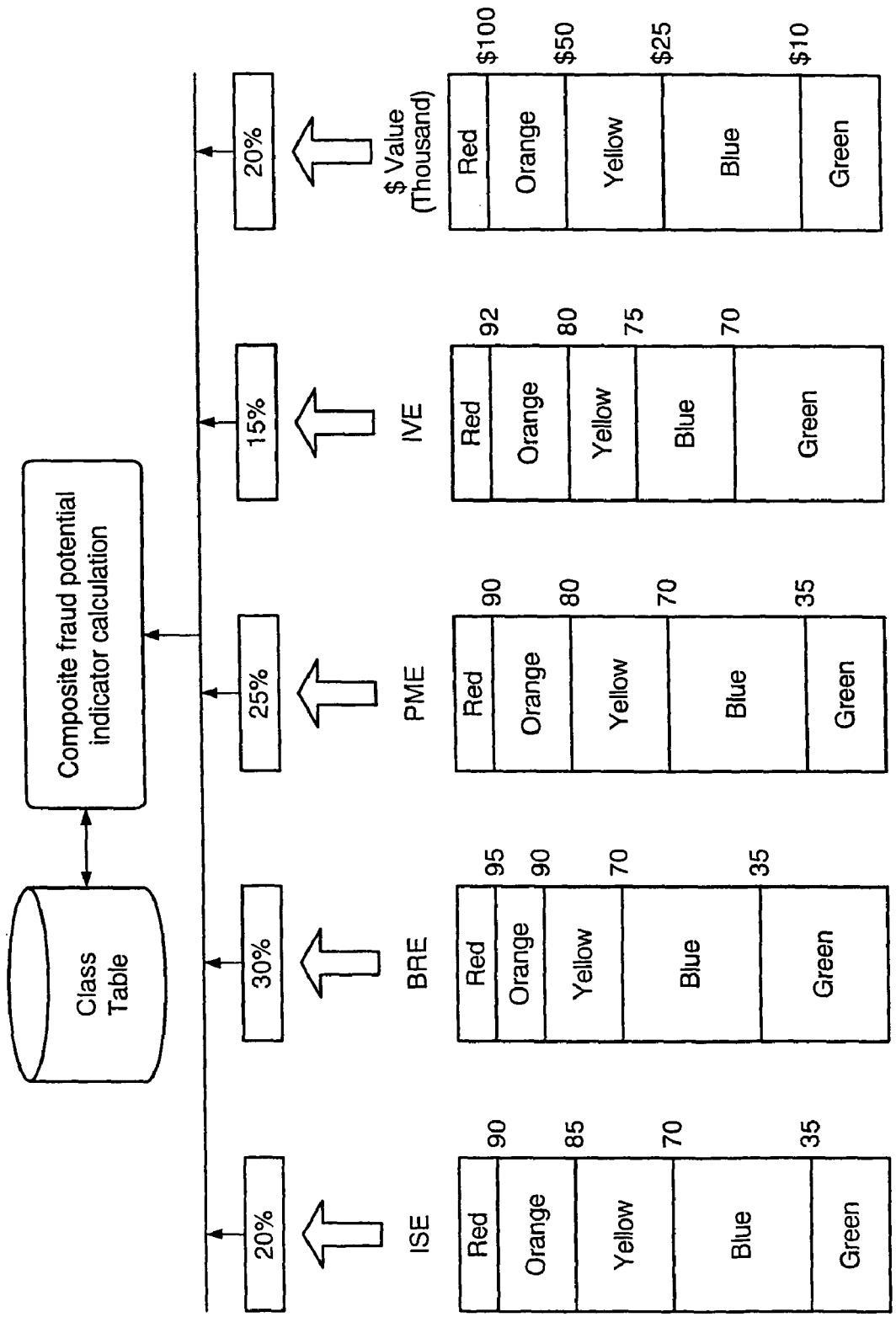
FIG. 29 illustrates an embodiment of calculating a fraud potential indicator.

In some embodiments, a report may be created. A report may include information about a request such as one or more request data elements, one or more fraud potential indicators, and/or a reason for assigning or not assigning a request to an investigator. A report may include a listing of which databases caused the request to have a high fraud potential indicator. A report may include levels, such as color or numerical, of fraud potential indicators of a composite fraud potential indicators, as depicted in FIG. 29. A report may facilitate investigation of requests by auditors, investigators, and/or SIUs. A report may suggest areas to investigate in a request. For example, a request including a doctor on a sanctioned doctor list may suggest that an investigator investigate the injuries claimed in a request. Including levels in a report of fraud potential indicators may indicate areas an adjuster, an investigator, and/or a SIU should investigate. In some embodiments, a report may include suggested portions of the request to investigate and/or a list of items that should be accomplished when investigating the request, which may be automatically generated. A report may automatically generate a task list to accomplish an investigation based on fraud potential indicators. A task list may include items such as photograph accident site, obtain statements from witnesses, and/or obtain second medical opinion of injuries for accident victim.

A report may be stored in a memory or a database of a request processing system. An investigator or user may access the report. For example, an investigator may be assigned a request to investigate. The investigator may receive an email or message alerting the investigator of the assignment. The investigator may, via one or more Internet protocols, access the report associated with the assigned request. In an embodiment, a report may not be accessible by investigators not assigned the request. In an embodiment, an investigator may have a task list stored on a memory of a request processing system which may include all tasks or requests assigned to the investigator.

A request may be automatically assigned to an investigator based on factors including, but not limited to, skill of the investigator, experience of the investigator, identity of the requester, a name of a medical provider associated with the request, geography, current caseload, maximum caseload assignable, other pending requests that need to be referred, and/or the character of the request or type of claim in the request. In one embodiment, a request may be assigned to an investigator based on the value of one or more fraud potential indicators associated with the request. For example, a fraud potential indicator may be assigned to a request based on predictive modeling and a specific investigator may be automatically assigned all requests that have predictive modeling fraud potential indicators within a predetermined range. In an embodiment, requests with fraud potential indicators above a predetermined range may be assigned to investigators with experience, such as a special investigative unit investigator.

In some embodiments, a composite or total fraud potential indicator may be assigned to a request. A sum, an average, and/or a median of individual fraud potential indicators may be the composite or total fraud potential indicator for a request. Requests with a total fraud potential indicator above a threshold value may be automatically assigned to a SIU. Requests with total fraud potential indicators below a predetermined value may be automatically granted (e.g., an insurance claim may be automatically paid). Requests in a range between a predetermined value and a threshold value may be automatically referred to an investigator. In one embodiment, all requests with total fraud potential indicators within a predetermined range may be automatically assigned to an investigator.

An automatic assignment subroutine or program may be coupled to a fraud detection program. An automatic assignment program may use a fraud potential indicator obtained from a fraud detection program. An automatic assignment program may assign requests continuously or in batches.

In some embodiments, a request may be assigned based on availability of investigators. For example, a request may not be assigned to an investigator on vacation or with a high caseload. In other embodiments, a request may be assigned to the investigator with the fewest number of pending cases. Requests may be assigned approximately equally to investigators (e.g., 30 requests assigned to each investigator per week). An investigator may be assigned a percentage of total requests received.

Figure 27:
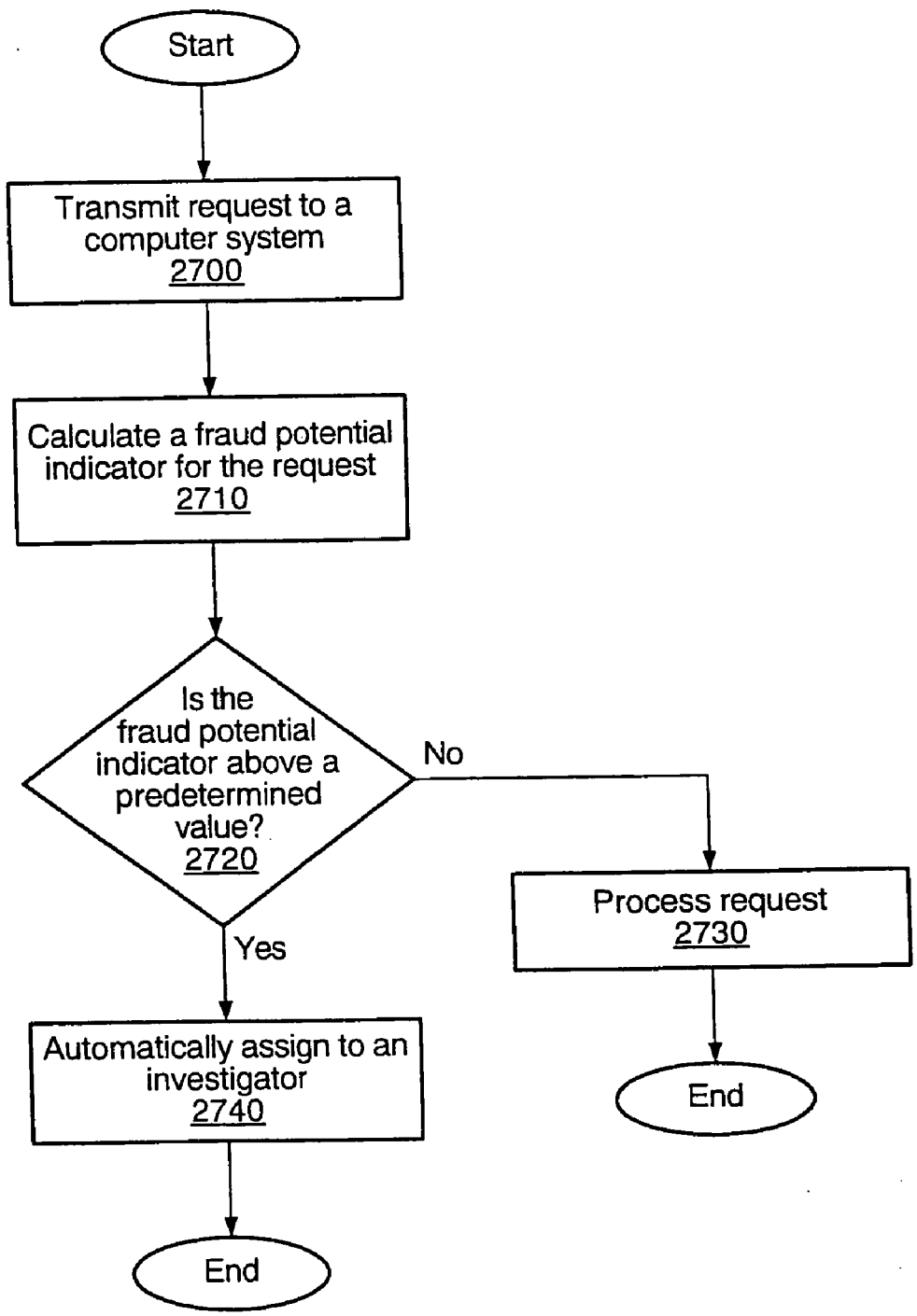
FIG. 27 illustrates a flowchart of an embodiment of a method for managing a request.

FIG. 27 depicts an embodiment of a method of managing requests. A user may transmit a request to a computer system 2700. In an embodiment, requests may be transmitted to a computer system in batches or continuously. Requests may be transmitted automatically. A fraud potential indicator is then calculated or assessed for each request 2710. A high fraud potential indicator may indicate a high probability that the request is fraudulent. It may be desirable to investigate claims when the probability that a request is fraudulent is above a predetermined limit. The predetermined limit may be determined from business rules, industry practice and/or experience, and/or past experience. If the fraud potential indicator is below a predetermined value 2720, then the request is processed (e.g., a claim is further processed to determine if it meets other criteria, a claim is paid, a financial transaction is allowed) 2730. If the fraud potential indicator associated with a request is above a predetermined value 2720, then the request is automatically assigned to an investigator.

Figure 28:
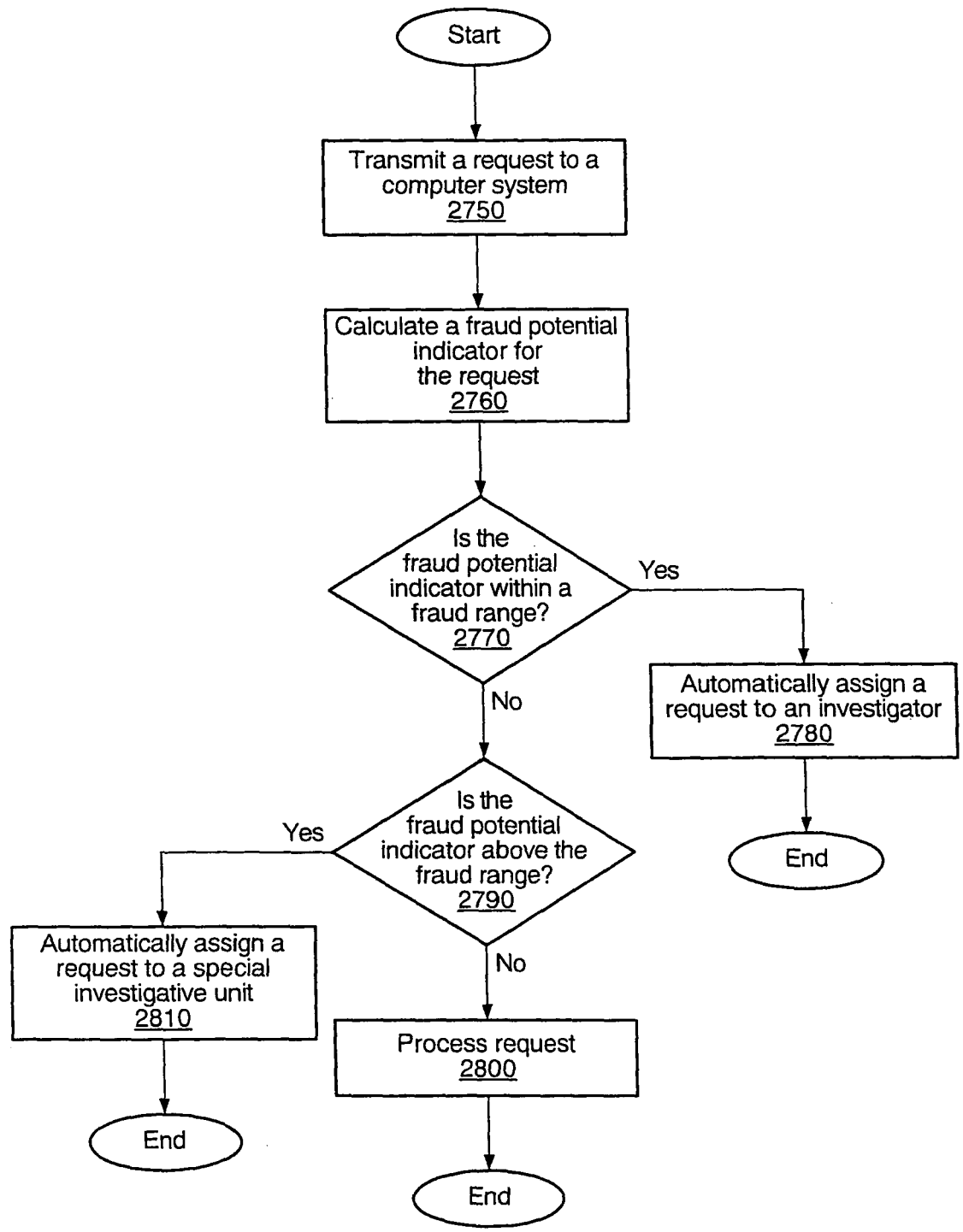
FIG. 28 illustrates a flowchart of an embodiment of a method for assigning a request to an investigator.

FIG. 28 depicts an embodiment of a method of automatically assigning a request. A request may be transmitted to a computer system (e.g., a request processing system) 2750. A fraud potential indicator may be calculated for the request 2760. In an embodiment, a low fraud potential indicator may indicate a high probability that the request is fraudulent. The fraud potential indicator may be compared to a predetermined range 2770. If the fraud potential indicator is within the range, then the request may be automatically assigned to an investigator 2780. If the fraud potential indicator is not in the range, the fraud potential indicator may be compared to the upper limit of the predetermined range 2790. If the fraud potential indicator is above the predetermined range, then the request may be processed 2800. If the fraud potential indicator is below the predetermined range, the request may be assigned to a special investigative unit 2810.

In some embodiments, more than one fraud potential indicator may be assigned to a request. A sum, an average, and/or a median of all or at least a portion of fraud potential indicators maybe obtained and used to determine whether to automatically assign a request to an investigator. FIG. 29 depicts an embodiment of calculating a total or composite fraud potential indicator from several fraud potential indicators assessed for a request. Fraud potential indicators may be assessed based on several models such as identity search engine (ISE), business rules engines (BRE), predictive modeling engines (PME), identity verification engines (IVE), and/or based on a value of a request. A fraud potential indicator may include a numerical indicator and/or a color indicator based on ranges of potentials for fraud. Fraud potential indicators may be combined to form a composite fraud potential indicator. As depicted in the embodiment in FIG. 29, a composite fraud potential indicator may be calculated (e.g., fraud potential severity calculation). For example, a composite fraud potential indicator may be a weighted average of fraud potential indicators. In an embodiment, a composite fraud potential indicator may be the sum of about 20 percent of the ISE fraud potential indicator, 30 percent of the BRE fraud potential indicator, 25 percent of the PME fraud potential indicator, 15 percent of the IVE fraud potential indicator, and 20 percent of the fraud potential indicator associated with the value of the request. Combining a plurality of fraud potential indicators may facilitate accurate fraud detection in request processing. A composite fraud potential indicator based on a weighted average of fraud potential indicators may allow factors and/or models that predict fraud more accurately to be weighted greater than fraud potential indicators that are less accurate by themselves in predicting fraud. Utilizing a composite fraud potential indicator may allow more accurate fraud prediction since factors and/or models that may indicate a slight to moderate potential for fraud may indicate a strong potential for fraud when combined with other factors and/or models that indicate a slight to moderate potential for fraud. For example, in an embodiment, filing an insurance claim for a single car collision without casualties may only indicate a slight potential for fraud while filing an insurance claim for a single car collision without casualties or witnesses the day before a policy expires may indicate a strong potential for fraud.

A composite fraud potential indicator may be compared to a database of values such as a class table to determine to whom a request associated with a fraud potential indicator may be assigned. In some embodiments, a database may be stored on a memory of a request processing system. A database may include fraud ranges associated with various risks of fraud. The fraud ranges may be based at least partially on business rules, industry experience, and/or data related to fraud. A request may be assigned to an adjuster, an investigator, and/or a special investigative unit.

Figure 30:
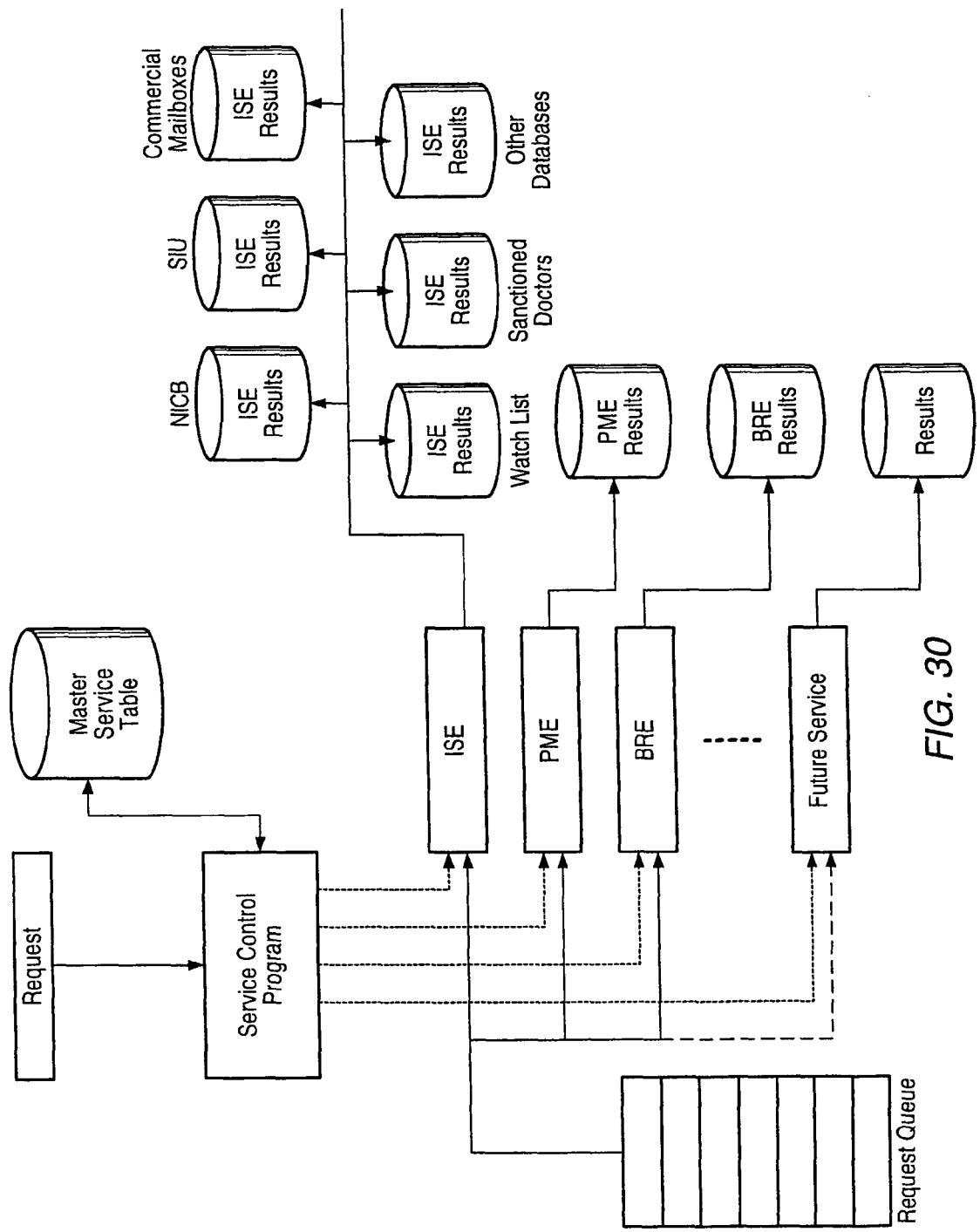
FIG. 30 illustrates an embodiment of assigning a request to an investigator.

FIG. 30 depicts an embodiment of processing a request. A request may be transmitted to a service control program of a request processing system. In some embodiments, request or claims may be transmitted or loaded to a database or request queue on a memory of a request processing system. Fraud potential indicators may be automatically assessed for each request in batches or continuously. The service control program calculates fraud potential indicators based on models such as, ISE, PME, BRE, and/or other models. An ISE fraud potential indicator may include comparing a request to databases such as, but not limited to, National Insurance Crime Bureau (NCIB) databases, SIU databases, watch lists, sanctioned doctors lists, and/or other databases. An ISE fraud potential indicator may include identifying whether a request includes information associated with fraudulent requests such as, listing a commercial mailbox. A service control program may obtain results for each fraud potential indicator. The results for each fraud potential indicator and/or a composite fraud potential indicator may be used to assign requests to auditors, investigators, and/or special investigative units. Assignments may be transmitted to a master service table. A master service table may include a list or a database of request assignments. A master service table may include information about skills and/or experience of auditors, investigators, and/or SIUs. Service control program of the request processing system may compare data about an auditor, investigator, and SIU skills and experience from a master service table to skills and/or experience preferred for a certain request. Service control program may select an auditor, investigator, and/or SIU that at least satisfies preferred skills and/or experience for investigation of a request.

In an embodiment, a single fraud potential indicator may be examined to determine if it meets predetermined criteria that would cause the request to be automatically assigned to an investigator. For example, it may be desirable to automatically assign all life insurance claim requests filed within two months of policy issuance and grant all life insurance claim requests filed 50 years after policy issuance. A policy length fraud potential indicator may be associated with the length of time between policy issuance and redemption. When the policy length fraud potential indicator is greater than a predetermined number (e.g., a value of the fraud potential indicator associated with a policy length of 50 years), then the request may be processed (e.g., the policy may be paid). When the policy length fraud potential indicator is below a predetermined number (e.g., a value of the fraud potential indicator associated with a policy length of two months), the request may be automatically assigned to an investigator.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link. In some embodiments, an insurance processing system may include a CPU and a memory coupled to the CPU. An insurance processing system memory may store programs that may be at least partially executed by the CPU of an insurance processing system. The program instructions may include receiving insurance information and processing the insurance information according to underwriting rules stored on a memory of an insurance processing system.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following requests.

What is claimed is:

1. A method of managing insurance claim requests comprising:

accessing, by a user system, an insurance request processing computer system;

transmitting one or more insurance claim requests relating to an accident to the insurance request processing computer system, wherein at least one of the insurance claim requests comprises one or more request data elements;

assessing, by the insurance request processing computer system, at least one fraud potential indicator for an insurance claim request relating to the accident, wherein the at least one fraud potential indicator comprises a numerical estimate of a probability of fraud in the insurance claim request, wherein the assessing of the at least one fraud potential indicator comprises:

comparing, by the insurance request processing computer system, at least one of the request data elements to one or more fraud models comprising at least one historical fraud pattern derived from insurance claims that have been proven fraudulent, wherein comparison of the at least one of the request data elements to one or more fraud models comprises searching for request patterns in the one or more request data elements that are similar to the at least one historical fraud pattern; and applying, by the insurance request processing computer system, one or more business rules to at least one of the request data elements, the application of the one or more business rules comprising:

computing one or more numerical values for the at least one fraud potential indicator using one or more formulas, wherein computing at least one of the numerical values for the at least one fraud potential indicator comprises:

multiplying a loss type multiplier by at least one other numerical value to produce the numerical value for the at least one fraud potential indicator, wherein the value of the loss type multiplier varies depending on the type of accident; and automatically assigning the insurance claim request if one or more fraud potential indicators is within a fraud range.

2. The method of claim 1, wherein the insurance claim request is automatically assigned to an adjuster.

3. The method of claim 1, wherein the insurance claim request is automatically assigned to an investigator.

4. The method of claim 1, wherein the insurance claim request is automatically assigned to a special investigative unit.

5. The method of claim 1, further comprising transmitting a report to an assigned investigator, wherein the report comprises the fraud potential indicator associated with the insurance claim request.

6. The method of claim 1, further comprising transmitting a report to an assigned investigator, wherein the report comprises:

the fraud potential indicator; and one or more reasons the insurance claim request was transferred to the assigned investigator.

7. The method of claim 1, wherein the insurance claim request is automatically assigned at least partially based on preferences of an investigator.

8. The method of claim 1, wherein the insurance claim request is automatically assigned at least partially based on where a request was filed.

9. The method of claim 1, wherein the insurance claim request comprises an insurance claim, and wherein the insurance claim request is automatically assigned at least partially based on the value of the insurance claim.

10. The method of claim 1, wherein the insurance claim request an automobile insurance claim, and wherein the insurance claim request is automatically assigned at least partially based on experiences of an investigator.

11. The method of claim 1, wherein the insurance claim request is automatically assigned at least partially based on the type of insurance claim request.

12. The method of claim 1, wherein the insurance claim request is automatically assigned at least partially based on the availability of an investigator.

13. The method of claim 1, wherein the insurance claim request is automatically assigned at least partially based on predetermined set of skills an investigator needs to investigate the insurance claim request.

14. The method of claim 1, wherein automatically assigning the insurance claim request to an investigator comprises:

comparing experiences of available investigators to predetermined skills required to investigate the insurance claim request; and selecting an investigator, wherein the investigator selected has the skills required to investigate the insurance claim request.

15. The method of claim 1, wherein automatically assigning the request if one or more fraud potential indicators is within a fraud range comprises:

assigning the request as non-fraudulent if the fraud potential indicator is within a fraud range below a fraud threshold value;

assigning the request to a first level of review if the fraud potential indicator is within a first fraud range above the fraud threshold value; and assigning the request to a second level of review if the fraud potential indicator is within a second fraud range that is different from the first fraud range and above the fraud threshold value.

16. The method of claim 1, wherein automatically assigning the request if one or more fraud potential indicators is within a fraud range comprises:

assigning for payment an insurance claim associated with the request if the fraud potential indicator is within a fraud range below a fraud threshold value;

assigning the request to a first level of review by a claims adjuster if the fraud potential indicator is within a first fraud range above the fraud threshold value;

assigning the request to a second level of review by an investigator if the fraud potential indicator is within a second fraud range that is different from the first fraud range and is indicative of a higher potential for fraud than the first range; and assigning the request to a third level of review by a special investigative unit if the fraud potential indicator is within a third fraud range that is different from the first range and the second fraud range and is indicative of a higher potential for fraud than the first range and the second range.

17. The method of claim 1, wherein at least one of the one or more insurance claim requests corresponds to an insurance claim for a particular accident, wherein determining at least one of the fraud potential indicators comprises applying one or more business rules to the at least one request corresponding to an insurance claim for a particular accident; wherein at least of the one of the business rules applies a loss type multiplier based on at least one loss type associated with the request, wherein the value of the loss type multiplier depends on a tendency for fraud associated with a request type of the request.

18. The method of claim 1, wherein at least one of the one or more insurance claim requests corresponds to an insurance claim for a particular accident, wherein determining at least one of the fraud potential indicators comprises applying one or more business rules to the at least one request corresponding to an insurance claim for a particular accident; wherein at least of the one of the business rules applies an injury type multiplier based on at least one injury type associated with the request, wherein the value of the injury type multiplier depends on a tendency for fraud associated with at least one injury type associated with the request.

19. The method of claim 1, wherein computing the one or more numerical values for the at least one fraud potential indicator using one or more formulas comprises:
multiplying an injury type multiplier by at least one other numerical value to produce the numerical value for the at least one fraud potential indicator, wherein the value of the injury type multiplier varies depending on the type of bodily injury alleged to have been sustained in an accident.

20. The method of claim 19, wherein, for the at least one fraud potential indicator, the injury type multiplier for at least one of the computed numerical values has a negative value, wherein a negative value of an injury type multiplier is contraindicative of fraud.

21. The method of claim 1, wherein, for the at least one fraud potential indicator, the at least one other value for at least one of the computed numerical values comprises a number of matches in a database.

22. The method of claim 1, wherein the accident is a vehicle accident, wherein the numerical value of the loss type multiplier varies depending on the type of vehicle accident, wherein the type of vehicle accident comprises a failure to yield, hit and run, or a single vehicle collision.

23. A computer readable non-transitory storage medium comprising program instructions stored thereon, wherein the program instructions are executable to implement:
accessing, by a user system, an insurance request processing computer system;
transmitting one or more insurance claim requests relating to an accident to the insurance request processing computer system, wherein at least one of the insurance claim requests comprises one or more request data elements;
assessing, by the insurance request processing computer system, at least one fraud potential indicator for an insurance claim request relating to the accident, wherein the at least one fraud potential indicator comprises a numerical estimate of a probability of fraud in the insurance claim request, wherein the assessing of the at least one fraud potential indicator comprises:
comparing, by the insurance request processing computer system, at least one of the request data elements to one or more fraud models comprising at least one historical fraud pattern derived from insurance claims that have been proven fraudulent, wherein comparison of the at least one of the request data elements to one or more fraud models comprises searching for request patterns in the one or more request data elements that are similar to the at least one historical fraud pattern; and
an application of applying, by the insurance request processing computer system, one or more business rules to at least one of the request data elements, the application of the one or more business rules comprising: computing one or more numerical values for the at least one fraud potential indicator using one or more formulas, wherein computing at least one of the numerical values for the at least one fraud potential indicator comprises:
multiplying a loss type multiplier by at least one other numerical value to produce the numerical value for the at least one fraud potential indicator, wherein the value of the loss type multiplier varies depending on the type of accident; and
automatically assigning the insurance claim request if one or more fraud potential indicators is within a fraud range.

24. An insurance processing system comprising:
a CPU;
a memory coupled to the CPU, wherein the memory comprises program instructions executable to implement:
accessing an insurance request processing computer system;
transmitting one or more insurance claim requests relating to an accident to the insurance request processing computer system, wherein at least one of the insurance claim requests comprises one or more request data elements;
assessing at least one fraud potential indicator for an insurance claim request relating to the accident, wherein the at least one fraud potential indicator comprises a numerical estimate of a probability of fraud in the insurance claim request, wherein the assessing of the at least one fraud potential indicator comprises:
comparing at least one of the request data elements to one or more fraud models comprising at least one historical fraud pattern derived from insurance claims that have been proven fraudulent, wherein comparison of the at least one of the request data elements to one or more fraud models comprises searching for request patterns in the one or more request data elements that are similar to the at least one historical fraud pattern; and
applying one or more business rules to at least one request data elements, the application of the one or more business rules comprising:
computing one or more numerical values for the at least one fraud potential indicator using one or more formulas, wherein computing at least one of the numerical values for the at least one fraud potential indicator comprises:
multiplying a loss type multiplier by at least one other numerical value to produce the numerical value for the at least one fraud potential indicator, wherein the value of the loss type multiplier varies depending on the type of accident; and
automatically assigning the insurance claim request if one or more fraud potential indicators is within a fraud range.

\* \* \* \* \*